(12) United States Patent
Xin et al.

(10) Patent No.: US 11,838,802 B2
(45) Date of Patent: Dec. 5, 2023

(54) SLICE INFORMATION PROCESSING METHOD AND APPARATUS

(71) Applicant: HUAWEI TECHNOLOGIES CO., LTD., Shenzhen (CN)

(72) Inventors: Yang Xin, Shanghai (CN); Xiaobo Wu, Shanghai (CN); Weiwei Chong, Shanghai (CN); Fangyuan Zhu, Beijing (CN); Clarissa Marquezan, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 427 days.

(21) Appl. No.: 17/213,514

(22) Filed: Mar. 26, 2021

(65) Prior Publication Data

US 2021/0219185 A1 Jul. 15, 2021

Related U.S. Application Data

(63) Continuation of application No. PCT/CN2019/107966, filed on Sep. 25, 2019.

(30) Foreign Application Priority Data

Sep. 28, 2018 (CN) .......................... 201811143575.3

(51) Int. Cl.
*H04W 28/24* (2009.01)
*H04W 28/10* (2009.01)
*H04W 84/04* (2009.01)

(52) U.S. Cl.
CPC ........... *H04W 28/24* (2013.01); *H04W 28/10* (2013.01); *H04W 84/042* (2013.01)

(58) Field of Classification Search
CPC ... H04W 28/24; H04W 28/10; H04W 84/042; H04W 24/02; H04W 76/12; H04W 28/16;
(Continued)

(56) References Cited

U.S. PATENT DOCUMENTS

| 10,070,344 B1 | 9/2018 | Dowlatkhah et al. |
| 2014/0078969 A1* | 3/2014 | Guo ................. H04W 72/121 370/329 |

(Continued)

FOREIGN PATENT DOCUMENTS

| CN | 107113243 A | 8/2017 |
| CN | 107872339 A | 4/2018 |

(Continued)

OTHER PUBLICATIONS

3GPP TR 28.801 V15.1.0 (Jan. 2018), 3rd Generation Partnership Project; Technical Specification Group Services and System Aspects; Telecommunication management; Study on management and orchestration of network slicing for next generation network(Release 15), 75 pages.

(Continued)

*Primary Examiner* — Don N Vo

(57) ABSTRACT

Embodiments of this application provide a slice information processing method and apparatus to preferentially allocate a network slice resource to a slice for which a slice service level agreement SLA has been signed. An example solution includes: An access network device determines that a slice service level agreement (SLA) has been signed for a first slice and that no slice SLA has been signed for a second slice. The access network device prioritizes a user behavior action of the first slice, or deprioritizes a user behavior action of the second slice.

20 Claims, 12 Drawing Sheets

(58) Field of Classification Search
CPC ...... H04W 36/30; H04W 76/27; H04L 47/24; H04L 47/2425; H04L 47/78
USPC ..................................................... 455/422.1
See application file for complete search history.

(56) References Cited

U.S. PATENT DOCUMENTS

| | | | |
|---|---|---|---|
| 2016/0352645 A1 | 12/2016 | Senarath et al. | |
| 2017/0085486 A1* | 3/2017 | Chung | H04L 43/20 |
| 2017/0086115 A1* | 3/2017 | Chung | H04L 67/1004 |
| 2018/0124854 A1 | 5/2018 | Myhre et al. | |
| 2018/0132138 A1* | 5/2018 | Senarath | H04L 41/0813 |

FOREIGN PATENT DOCUMENTS

| | | |
|---|---|---|
| CN | 108023749 A | 5/2018 |
| CN | 108141470 A | 6/2018 |
| CN | 108184268 A | 6/2018 |
| CN | 108282352 A | 7/2018 |
| EP | 3327990 A1 | 5/2018 |
| WO | 2018074953 A1 | 4/2018 |

OTHER PUBLICATIONS

China Mobile et al., Use case NWDA-Assisted slice SLA guarantee and related Key Issue update. SA WG2 Meeting #128bis, Aug. 20, 2018, Sophia Antipolis, France, S2-189048, 2 pages.

* cited by examiner

SLICE INFORMATION PROCESSING METHOD AND APPARATUS

CROSS-REFERENCE TO RELATED APPLICATIONS

This application is a continuation of International Application No. PCT/CN2019/107966, filed on Sep. 25, 2019, which claims priority to Chinese Patent Application No. 201811143575.3, filed on Sep. 28, 2018. The disclosure of the aforementioned applications are hereby incorporated by reference in their entireties.

TECHNICAL FIELD

Embodiments of this application relate to the field of communications technologies, and in particular, to a slice information processing method and apparatus.

BACKGROUND

To satisfy different requirements of different communications services for network performance, a concept of a network slice (NS) is introduced to a 5G network. In other words, resources and functions of actual networks are classified in the 5G network to form different network slices to satisfy different requirements. This can reduce network operation investment costs and enrich network operation modes.

Currently, a network management device determines service level agreement (SLA) templates of network slices of different tenants based on service level requirements of the tenants, and deploys the corresponding network slices based on the SLA templates. However, granularities of the SLA templates determined by the network management device based only on the service level requirements of the tenants are quite coarse, and consequently performance of the network slices can hardly be ensured. In addition, when allocating network resources to the network slices of the different tenants, the network management device can determine only a rough resource deployment status based on the SLA templates, and consequently a problem of a resource waste or a deployment resource shortfall may be caused, deteriorating performance of the network slices. The ultimate goal of ensuring a slice SLA is to ensure service experience satisfaction of a tenant using a service in a slice.

Currently, in the prior art, a slice SLA is ensured through management plane adjustment. A specific process is as follows: A network data analytics function (NWDAF) network element obtains service satisfaction of each service in a slice. Then, the NWDAF may train a mapping relationship between service satisfaction of each service and a network slice key performance indicator (KPI). After obtaining at least one slice requirement list sent by a PCF network element, the NWDA sends a network slice KPI list to the PCF network element for each slice requirement list. The slice requirement list is shown in Table 1, and the network slice KPI list is shown in Table 2.

TABLE 1

Content of the slice requirement list

| IE/Group Name | Presence | Range | Semantics description |
|---|---|---|---|
| Slice Requirement list | | 1 | Slice requirement list |
| >Slice Requirement IEs | | 1 to M | Slice requirement information element |
| >>S-NSSAI | M | | Slice identifier |
| >>Application Requirement list | M | 1 to N | Service requirement list in a slice |
| >>>Application ID | M | | Service identifier |
| >>>Application Requirement | M | | Service satisfaction requirement, for example, 95%, which indicates that a service satisfaction percentage needs to be greater than or equal to 95% (for example, a MOS of a voice service is greater than or equal to 3.0). |

TABLE 2

Network slice KPI list

| IE/Group Name | Presence | Range | IE type and reference |
|---|---|---|---|
| Network Slice KPIs List | | 1 | Network slice KPI list |
| > Network Slice KPIs | | 1 to M | Network KPI information element |
| >> UL or DL F1-U Packet Loss Rate for gNB-CU | M | | Uplink or downlink F1-U interface packet loss rate for gNB-CU |
| >> DL Packet Drop Rate for gNB-CU | M | | Downlink packet drop rate for gNB-CU |
| ... | | | |
| >> Network Slice KPI X | M | | Network slice KPI X |

When network resources are insufficient to satisfy all slice requirements, the PCF network element determines a slice requirement list based on a slice priority, a local operator policy, and the like, and sends a network slice KPI list corresponding to the selected slice requirement list to an operation, administration and maintenance (OAM) network element. The OAM adjusts network slice resources based on the network slice KPI list.

However, a common method for a network configuration of a current network management system is performing scaling through network functions virtualization (NFV), which is applicable only to a core network device and is not applicable to an access network device. Currently, a key factor that affects service experience in a slice is still an air interface, and consequently the management plane-based solution may not be available. In addition, it takes a long time for the network management system to adjust network devices.

SUMMARY

Embodiments in the present application provide a slice information processing method and apparatus, to preferentially allocate a network slice resource to a slice for which a slice service level agreement SLA has been signed.

To achieve the foregoing objective, the embodiments of this application provide the following technical solutions.

According to a first aspect, this application provides a slice information processing method. The solution includes: An access network device determines that a slice service level agreement SLA has been signed for a first slice and that no slice SLA has been signed for a second slice. The access network device prioritizes a user behavior action of the first slice, or deprioritizes a user behavior action of the second slice.

According to the slice information processing method provided in this embodiment of this application, the access network device determines that a slice service level agreement SLA has been signed for the first slice and that no slice SLA has been signed for the second slice. In this way, when resources in a network are insufficient, because a slice SLA has been signed for the first slice, an air interface resource may be preferentially allocated to the first slice. For example, the access network device prioritizes the user behavior action of the first slice, or deprioritizes the user behavior action of the second slice. In this way, service experience in a slice can be improved.

In a possible implementation, the user behavior action includes user access control or user quality of service (QoS) flow management control. In this way, user access and QoS flow processing are facilitated.

In a possible implementation, the user access control includes user radio resource control (RRC) establishment and/or user RRC release; and the user QoS flow management control includes QoS flow establishment of a user service and/or QoS flow quality assurance of a user service.

In a possible implementation, that an access network device determines that a slice SLA has been signed for a first slice and that no slice SLA has been signed for a second slice includes: The access network device determines, based on first indication information, that an SLA has been signed for the first slice, where the first indication information indicates that an SLA has been signed for the first slice; and/or the access network device determines, based on second indication information, that no slice SLA has been signed for the second slice, where the second indication information indicates that no slice SLA has been signed for the second slice.

In a possible implementation, the method provided in this embodiment of this application further includes: The access network device obtains the first indication information from at least one policy management control network element corresponding to the first slice; and/or the access network device obtains the second indication information from at least one policy management control network element corresponding to the second slice.

In a possible implementation, the method provided in this embodiment of this application further includes: The access network device obtains, in a process of establishing a QoS flow corresponding to a service of the first slice, the first indication information from at least one policy management control network element corresponding to the first slice; and/or the access network device obtains, in a process of establishing a QoS flow corresponding to a service of the second slice, the second indication information from at least one policy management control network element corresponding to the second slice. The first indication information or the second indication information corresponding to the slice is obtained in the process of establishing the QoS flow, so that the access network device can determine a priority of the slice in the process of establishing the QoS flow corresponding to the service.

In a possible implementation, the first indication information is further used to indicate that the first slice is a slice that has been tested or deployed, and the second indication information is further used to indicate that the second slice is a slice that has not been tested or deployed.

In a possible implementation, the method provided in this embodiment of this application further includes: The access network device obtains at least one of updated first indication information corresponding to the first slice or updated second indication information corresponding to the second slice.

In a possible implementation, the method provided in this embodiment of this application further includes: the updated first indication information corresponding to the first slice indicates to deactivate, modify, or delete the first indication information corresponding to the first slice; and the updated second indication information corresponding to the second slice indicates to deactivate, modify, or delete the second indication information corresponding to the second slice.

According to a second aspect, an embodiment of this application provides a slice information processing method. The solution includes: A slice management control network element determines that a slice service level agreement SLA has been signed for a first slice and that no slice SLA has been signed for a second slice; the slice management control network element sends first indication information to at least one policy management control network element corresponding to the first slice, where the first indication information indicates that an SLA has been signed for the first slice; and/or the slice management control network element sends second indication information to at least one policy management control network element corresponding to the second slice, where the second indication information indicates that no SLA has been signed for the second slice.

In a possible implementation, the method provided in this embodiment of this application further includes: The slice management control network element sends a first request to a network repository function network element, where the first request includes at least one of identification information of the first slice and identification information of the second slice. The slice management control network element receives a first response from the network repository function network element, where the first response includes at least one of identification information of the at least one policy management control network element corresponding to the first slice and identification information of the at least one policy management control network element corresponding to the second slice, and the identification information of the policy management control network element is used to determine the policy management control network element.

In a possible implementation, the method provided in this embodiment of this application further includes: that a slice management control network element determines that a slice SLA has been signed for a first slice includes: The slice management control network element determines that first information corresponding to the first slice exists on the slice management control network element and that a slice SLA has been signed for the first slice, where the first information corresponding to the first slice includes one or more of identification information, slice level information, network area information, time information, at least one piece of user control information, or at least one piece of service control information.

In a possible implementation, the method provided in this embodiment of this application further includes: that a slice management control network element determines that no slice SLA has been signed for a second slice includes: The slice management control network element determines that first information corresponding to the second slice does not exist on the slice management control network element and that no slice SLA has been signed for the second slice, where the first information corresponding to the second slice includes one or more of identification information, slice level information, network area information, time information, at least one piece of user control information, or at least one piece of service control information.

In a possible implementation, the method provided in this embodiment of this application further includes: each of the at least one piece of user control information includes network area information and at least one piece of network slice instance information; and the network slice instance information includes identification information and a maximum user quantity of the network slice instance.

In a possible implementation, the method provided in this embodiment of this application further includes: each of the at least one piece of service control information includes network area information and at least one piece of network slice instance information; the network slice instance information includes identification information and at least one piece of service configuration information of the network slice instance; the service configuration information includes a service identifier of the service, a maximum service quantity of the service, and at least one piece of service experience interval information of the service; and the service experience interval information includes a size of the service experience interval, a maximum service quantity of the service experience interval, and at least one set of quality of service (QoS) parameters of the service experience interval.

In a possible implementation, the method provided in this embodiment of this application further includes: the first indication information is further used to indicate that the first slice is a slice that has been tested or deployed; and the second indication information is further used to indicate that the second slice is a slice that has not been tested or deployed.

In a possible implementation, the method provided in this embodiment of this application further includes: The slice management control network element sends updated first indication information corresponding to the first slice to the at least one policy management control network element corresponding to the first slice; and/or the slice management control network element sends updated second indication information corresponding to the second slice to the at least one policy management control network element corresponding to the second slice.

In a possible implementation, the updated first indication information corresponding to the first slice indicates to deactivate, modify, or delete the first indication information corresponding to the first slice; and the updated second indication information corresponding to the second slice indicates to deactivate, modify, or delete the second indication information corresponding to the second slice.

In a possible implementation, the method provided in this embodiment of this application further includes: The slice management control network element obtains the first information corresponding to the first slice or the first information corresponding to the second slice from a data analytics function network element.

According to a third aspect, this application provides a slice information processing apparatus. The slice information processing apparatus may implement the method in any one of the first aspect or the possible implementations of the first aspect, and therefore can also achieve the beneficial effects in any one of the first aspect or the possible implementations of the first aspect. The slice information processing apparatus may be an access network device, or may be an apparatus that can support the access network device in implementing the method in any one of the first aspect or the possible implementations of the first aspect, for example, a chip applied to the access network device. The slice information processing apparatus may implement the foregoing method by using software or hardware, or by executing corresponding software by using hardware.

In an example, an embodiment of this application provides a slice information processing apparatus, including: a determining unit, configured to determine that a slice service level agreement SLA has been signed for a first slice and that no slice SLA has been signed for a second slice; and a processing unit, configured to: prioritize a user behavior action of the first slice, or deprioritize a user behavior action of the second slice.

In a possible implementation, the user behavior action includes user access control or user QoS flow management control.

In a possible implementation, the user access control includes user RRC establishment and/or user RRC release; and the user QoS flow management control includes QoS flow establishment of a user service and/or QoS flow quality assurance of a user service.

In a possible implementation, the determining unit is configured to determine, based on first indication information, that an SLA has been signed for the first slice, where the first indication information indicates that an SLA has been signed for the first slice; and/or the determining unit is configured to determine, based on second indication information, that no slice SLA has been signed for the second slice, where the second indication information indicates that no slice SLA has been signed for the second slice In a possible implementation, the processing unit is further configured to: obtain the first indication information from at least one policy management control network element corresponding to the first slice; and/or obtain the second indication information from at least one policy management control network element corresponding to the second slice.

In a possible implementation, the processing unit is further configured to obtain, in a process of establishing a QoS flow corresponding to a service of the first slice, the first indication information from at least one policy management control network element corresponding to the first slice; and/or the processing unit is further configured to obtain, in a process of establishing a QoS flow corresponding to a service of the second slice, the second indication information from at least one policy management control network element corresponding to the second slice.

In a possible implementation, the first indication information is further used to indicate that the first slice is a slice that has been tested or deployed, and the second indication information is further used to indicate that the second slice is a slice that has not been tested or deployed.

In a possible implementation, the processing unit is further configured to obtain at least one of updated first indication information corresponding to the first slice or updated second indication information corresponding to the second slice.

In a possible implementation, the updated first indication information corresponding to the first slice indicates to deactivate, modify, or delete the first indication information corresponding to the first slice; and the updated second indication information corresponding to the second slice indicates to deactivate, modify, or delete the second indication information corresponding to the second slice.

In another possible example, an embodiment of this application further provides a slice information processing apparatus. The slice information processing apparatus may be an access network device or a chip applied to the access network device. The slice information processing apparatus includes a processor and a communications interface. The communications interface is configured to support the slice information processing apparatus in performing the steps of receiving and sending a message/data on the slice information processing apparatus side in any one of the first aspect or the possible implementations of the first aspect. The processor is configured to support the slice information processing apparatus in performing the step of processing a message/data on the slice information processing apparatus side in any one of the first aspect or the possible implementations of the first aspect. For specific corresponding steps, refer to the descriptions in any one of the first aspect or the possible implementations of the first aspect. Details are not described herein again.

Optionally, the communications interface and the processor of the slice information processing apparatus are coupled to each other.

Optionally, the slice information processing apparatus may further include a memory, configured to store code and data. The processor, the communications interface, and the memory are coupled to each other.

According to a fourth aspect, an embodiment of this application provides a slice information processing apparatus. The slice information processing apparatus may implement the method in any one of the second aspect or the possible implementations of the second aspect, and therefore can also achieve the beneficial effects in any one of the second aspect or the possible implementations of the second aspect. The slice information processing apparatus may be a slice management control network element, or may be an apparatus that can support the slice management control network element in implementing the method in any one of the second aspect or the possible implementations of the second aspect, for example, a chip applied to the slice management control network element. The slice information processing apparatus may implement the foregoing method by using software or hardware, or by executing corresponding software by using hardware.

In an example, the slice information processing apparatus includes: a determining unit, configured to determine that a slice SLA has been signed for a first slice and that no slice SLA has been signed for a second slice; and a sending unit, configured to: send first indication information to at least one policy management control network element corresponding to the first slice, where the first indication information indicates that an SLA has been signed for the first slice; and/or send second indication information to at least one policy management control network element corresponding to the second slice, where the second indication information indicates that no SLA has been signed for the second slice.

It should be understood that, if the policy management control network element negotiates with the slice management control network element that the first indication information does not need to be sent for the slice for which a slice SLA has been signed, the sending unit sends the second indication information only to the at least one policy management control network element corresponding to the second slice. If the policy management control network element negotiates with the slice management control network element that the first indication information need to be sent for the slice for which a slice SLA has been signed, the sending unit sends the first indication information only to the at least one policy management control network element corresponding to the first slice. If the policy management control network element negotiates with the slice management control network element that the indication information needs to be sent for both the slice for which a slice SLA has been signed and the slice for which no slice SLA has been signed, the sending unit sends the first indication information and the second indication information.

In a possible implementation, the sending unit is further configured to send a first request to a network repository function network element, where the first request includes at least one of identification information of the first slice and identification information of the second slice; and the apparatus further includes a receiving unit, configured to receive a first response from the network repository function network element, where the first response includes at least one of identification information of the at least one policy management control network element corresponding to the first slice and identification information of the at least one policy management control network element corresponding to the second slice, and the identification information of the policy management control network element is used to determine the policy management control network element.

In a possible implementation, the determining unit is configured to determine that first information corresponding to the first slice exists on the slice management control network element and that a slice SLA has been signed for the first slice, where the first information corresponding to the first slice includes one or more of identification information, slice level information, network area information, time information, at least one piece of user control information, or at least one piece of service control information.

In a possible implementation, the determining unit is configured to determine that first information corresponding to the second slice does not exist and that no slice SLA has been signed for the second slice, where the first information corresponding to the second slice includes one or more of identification information, slice level information, network area information, time information, at least one piece of user control information, or at least one piece of service control information.

In a possible implementation, each of the at least one piece of user control information includes network area information and at least one piece of network slice instance information; and the network slice instance information includes identification information and a maximum user quantity of the network slice instance.

In a possible implementation, each of the at least one piece of service control information includes network area information and at least one piece of network slice instance information; the network slice instance information includes identification information and at least one piece of service configuration information of the network slice instance; the service configuration information includes a service identifier of the service, a maximum service quantity of the service, and at least one piece of service experience interval information of the service; and the service experience interval information includes a size of the service experience interval, a maximum service quantity of the service experience interval, and at least one set of QoS parameters of the service experience interval. Each set of QoS parameters includes one or more of a guaranteed bit rate (GFBR), a packet delay budget (PDB), a packet error rate (Packet Error Rate, PER), a maximum packet loss rate (Max PLR), an average window size (AWS), and the like.

In a possible implementation, the first indication information is further used to indicate that the first slice is a slice that has been tested or deployed, and the second indication information is further used to indicate that the second slice is a slice that has not been tested or deployed.

In a possible implementation, the sending unit is further configured to send updated first indication information corresponding to the first slice to the at least one policy management control network element corresponding to the first slice; and/or the sending unit is further configured to send updated second indication information corresponding to the second slice to the at least one policy management control network element corresponding to the second slice.

In a possible implementation, the updated first indication information corresponding to the first slice indicates to deactivate, modify, or delete the first indication information corresponding to the first slice; and the updated second indication information corresponding to the second slice indicates to deactivate, modify, or delete the second indication information corresponding to the second slice.

In a possible implementation, the processing unit is configured to obtain the first information corresponding to the first slice or the first information corresponding to the second slice from a data analytics function network element.

In another possible example, an embodiment of this application further provides a slice information processing apparatus. The slice information processing apparatus may be a slice management control network element or a chip applied to the slice management control network element. The slice information processing apparatus includes a processor and a communications interface. The communications interface is configured to support the slice information processing apparatus in performing the steps of receiving and sending a message/data on the slice information processing apparatus side in any one of the second aspect or the possible implementations of the second aspect. The processor is configured to support the slice information processing apparatus in performing the step of processing a message/data on the slice information processing apparatus side in any one of the second aspect or the possible implementations of the second aspect. For specific corresponding steps, refer to the descriptions in any one of the second aspect or the possible implementations of the second aspect. Details are not described herein again.

Optionally, the communications interface and the processor of the slice information processing apparatus are coupled to each other.

Optionally, the slice information processing apparatus may further include a memory, configured to store code and data. The processor, the communications interface, and the memory are coupled to each other.

According to a fifth aspect, an embodiment of this application provides a slice information processing method, including: A data analytics function network element receives a second request from a slice management control network element, where the second request is used to request first information of a slice network including at least one slice, the first information is used for user control and/or service control of each of the at least one slice, and the second request includes identification information of each of the at least one slice. The data analytics function network element sends a second response to the slice management control network element, where the second response includes one or more of the following information about each slice: at least one piece of user control information and at least one piece of service control information.

In a possible implementation, the second request further includes one or more of the following information about the slice: time information, geographical area information, and service requirement information of at least one service, and the service requirement information indicates a parameter that needs to be satisfied for the service.

In a possible implementation, the service requirement information includes one or more of the following information about the service: a service identifier, a first data value of service experience, a first data value of a total service quantity, a first data value of a percentage of services satisfying the first data value of service experience, and network quality requirement information, and the network quality requirement information indicates a network quality parameter required by the service.

In a possible implementation, the network quality requirement information includes one or more of the following information: a first bandwidth data value, a first delay data value, a first packet loss rate data value, and a first jitter data value.

In a possible implementation, the second response further includes identification information of each slice and one or more of the following information corresponding to each slice: slice level information, network area information, or time information; and the slice level information indicates a load level or a congestion level of the slice.

In a possible implementation, the second response further includes network level information of the slice network, and the network level information indicates a load level or a congestion level of the slice network.

In a possible implementation, the user control information includes network area information and at least one piece of network slice instance information.

The network slice instance information includes identification information and a maximum user quantity of the network slice instance. For example, the network area information may be identifiers of one or more cells.

In a possible implementation, the user control information includes at least one of network area information and at least one piece of network slice instance information; and the network slice instance information includes identification information and a maximum user quantity of the network slice instance.

In a possible implementation, the service control information includes at least one of network area information and at least one piece of network slice instance information; the network slice instance information includes identification information and at least one piece of service configuration information of the network slice instance; the service configuration information includes a service identifier, a maximum service quantity of the service, and at least one piece of service experience interval information of the service; and the service experience interval information includes a size of the service experience interval, a maximum service quantity of the service experience interval, and at least one set of QoS parameters of the service experience interval.

In a possible implementation, the method provided in this embodiment of this application further includes: The data analytics function network element sends, to the slice management control network element, one or more of the following information about the slice: identification information, geographical area information, and service response information of at least one service of the slice, where the service response information includes one or more of the following information about the service: a service identifier, a second data value of a total service quantity, a second data value of a percentage of services satisfying a first data value of service experience, and network quality response information, and the network quality response information includes one or more of the following information: a second bandwidth data value, a second delay data value, a second packet loss rate data value, and a second jitter data value.

In a possible implementation, the method provided in this embodiment of this application further includes: The data analytics function network element obtains service data of at least one QoS flow corresponding to each slice on a service network element and network data of at least one QoS flow corresponding to each slice on a network element, where the service data includes a correlation identifier and geographical area information, and the network data includes a correlation identifier and network area information. The data analytics function network element processes, based on the correlation identifier, the service data of the at least one QoS flow corresponding to each slice and the network data of the at least one QoS flow corresponding to each slice, to obtain second information corresponding to each slice, where the second information includes at least network area information.

In a possible implementation, the geographical area information includes one or more of the following information: identification information, at least one cell identifier, at least one tracking area identifier, at least one routing area identifier, and at least one piece of global positioning system GPS information.

In a possible implementation, the network area information includes one or more of the following information about the network area: identification information, at least one cell identifier, at least one tracking area identifier, at least one routing area identifier, and at least one piece of GPS information.

In a possible implementation, the time information includes one or more of the following information: a timestamp, a time window, a time interval, and a time period.

According to a sixth aspect, an embodiment of this application provides a slice information processing apparatus. The slice information processing apparatus may implement the method in any one of the fifth aspect or the possible implementations of the fifth aspect, and therefore can also achieve the beneficial effects in any one of the fifth aspect or the possible implementations of the fifth aspect. The slice information processing apparatus may be a data analytics function network element, or may be an apparatus that can support the data analytics function network element in implementing the method in any one of the fifth aspect or the possible implementations of the fifth aspect, for example, a chip applied to the data analytics function network element. The slice information processing apparatus may implement the foregoing method by using software or hardware, or by executing corresponding software by using hardware.

In an example, the apparatus provided in this embodiment of this application includes: a receiving unit, configured to receive a second request from a slice management control network element, where the second request is used to request first information of a slice network including at least one slice, the first information is used for user control and/or service control of each of the at least one slice, and the second request includes identification information of each of the at least one slice; and a sending unit, configured to send a second response to the slice management control network element, where the second response includes one or more of the following information about each slice: at least one piece of user control information and at least one piece of service control information.

In a possible implementation, the second request further includes one or more of the following information about the slice:
time information, geographical area information, and service requirement information of at least one service, and the service requirement information includes one or more of the following information about the service: a service identifier, a first data value of service experience, a first data value of a total service quantity, a first data value of a percentage of services satisfying the first data value of service experience, and network quality requirement information.

The network quality requirement information includes one or more of the following information: a first bandwidth data value, a first delay data value, a first packet loss rate data value, and a first jitter data value.

In a possible implementation, the second response further includes at least one of identification information, network area information, or time information of each slice.

In a possible implementation, the user control information includes network area information and at least one piece of network slice instance information, and the network slice instance information includes identification information and a maximum user quantity of the network slice instance.

In a possible implementation, the service control information includes network area information and at least one piece of network slice instance information; and the network slice instance information includes identification information and at least one piece of service configuration information of the network slice instance; the service configuration information includes a service identifier of the service, a maximum service quantity of the service, and at least one piece of service experience interval information of the service; and the service experience interval information includes a size of the service experience interval, a maximum service quantity of the service experience interval, and at least one set of QoS parameters of the service experience interval.

In a possible implementation, the sending unit is further configured to send, to the slice management control network element, one or more of the following information about the slice: identification information, geographical area information, and service response information of at least one service of the slice, where the service response information includes one or more of the following information about the service: a service identifier, a second data value of a total service quantity, a second data value of a percentage of services satisfying a first data value of service experience, and network quality response information, and the network quality response information includes one or more of the following information: a second bandwidth data value, a second delay data value, a second packet loss rate data value, and a second jitter data value.

In a possible implementation, the apparatus further includes a processing unit, configured to: obtain service data of at least one QoS flow corresponding to each slice on a service network element and network data of at least one QoS flow corresponding to each slice on a network network element, where the service data includes a correlation identifier and geographical area information, and the network data includes a correlation identifier and network area information; and process, based on the correlation identifier, the service data of the at least one QoS flow corresponding to each slice and the network data of the at least one QoS flow corresponding to each slice, to obtain second information corresponding to each slice, where the second information includes at least network area information.

In a possible implementation, the geographical area information includes one or more of the following information: identification information, at least one cell identifier, at least one tracking area identifier, at least one routing area identifier, and at least one piece of global positioning system GPS information.

In a possible implementation, the network area information includes one or more of the following information about the network area: identification information, at least one cell identifier, at least one tracking area identifier, at least one routing area identifier, and at least one piece of GPS information.

In a possible implementation, the time information includes one or more of the following information: a timestamp, a time window, a time interval, and a time period.

In another possible example, an embodiment of this application further provides a slice information processing apparatus. The slice information processing apparatus may be a data analytics function network element or a chip applied to the data analytics function network element. The slice information processing apparatus includes a processor and a communications interface. The communications interface is configured to support the slice information processing apparatus in performing the steps of receiving and sending a message/data on the slice information processing apparatus side in any one of the fifth aspect or the possible implementations of the fifth aspect. The processor is configured to support the slice information processing apparatus in performing the step of processing a message/data on the slice information processing apparatus side in any one of the fifth aspect or the possible implementations of the fifth aspect. For specific corresponding steps, refer to the descriptions in any one of the fifth aspect or the possible implementations of the fifth aspect. Details are not described herein again.

Optionally, the communications interface and the processor of the slice information processing apparatus are coupled to each other.

Optionally, the slice information processing apparatus may further include a memory, configured to store code and data. The processor, the communications interface, and the memory are coupled to each other.

According to a seventh aspect, an embodiment of this application provides a service processing method. The solution includes: A policy management control network element obtains first indication information that corresponds to a first slice and that indicates that a slice SLA has been signed, or obtains second indication information that corresponds to a second slice and indicates that no slice SLA has been signed. The policy management control network element provides a service for at least one of the first slice and the second slice. The policy management control network element sends, to an access network device, the first indication information corresponding to the first slice or the second indication information corresponding to the second slice.

In an example, the policy management control network element obtains, from a slice management control network element, the first indication information corresponding to the first slice or the second indication information corresponding to the second slice. In another example, the policy management control network element determines, based on preconfigured information, at least one of the first indication information corresponding to the first slice or the second indication information corresponding to the second slice.

In a possible implementation, the policy management control network element may send a first message to the slice management control network element, where the first message is used to request whether a slice SLA has been signed for each of at least one slice, and the first message includes identification information of the at least one slice.

In a possible implementation, the policy management control network element sends, to the access network device in a process of establishing a QoS flow corresponding to a service of any one of the at least one slice, indication information (for example, the first indication information or the second indication information) used to indicate whether a slice SLA has been signed for the any slice. For example, the policy management control network element may add the first indication information or the second indication information corresponding to the any slice to a QoS flow establishment request message, and then send the QoS flow establishment request message to the access network device. For example, the policy management control network element may send the QoS flow establishment request message to the access network device by using a session management function network element and/or an access and mobility management function network element.

In a possible implementation, the policy management control network element sends the first indication information or the second indication information corresponding to any one of at least two slices to the access network device by using a session management function network element and/or an access and mobility management function network element.

According to an eighth aspect, an embodiment of this application provides a slice information processing apparatus. The slice information processing apparatus may implement the method in any one of the seventh aspect or the possible implementations of the seventh aspect, and therefore can also achieve the beneficial effects in any one of the seventh aspect or the possible implementations of the seventh aspect. The slice information processing apparatus may be a policy management control network element, or may be an apparatus that can support the policy management control network element in implementing the method in any one of the seventh aspect or the possible implementations of the seventh aspect, for example, a chip applied to the policy management control network element. The slice information processing apparatus may implement the foregoing method by using software or hardware, or by executing corresponding software by using hardware.

In an example, the slice information processing apparatus includes: a processing unit, configured to: obtain first indication information that corresponds to a first slice and that indicates that a slice SLA has been signed, or obtain second indication information that corresponds to a second slice and that indicates that no slice SLA has been signed, where the slice information processing apparatus provides a service for at least one of the first slice and the second slice; and a sending unit, configured to send, to an access network device, the first indication information corresponding to the first slice or the second indication information corresponding to the second slice.

In an example, the processing unit obtains, from a slice management control network element, the first indication information corresponding to the first slice or the second indication information corresponding to the second slice. In another example, the processing unit determines, based on preconfigured information, at least one of the first indication information corresponding to the first slice or the second indication information corresponding to the second slice.

In a possible implementation, the sending unit may send a first message to the slice management control network element, where the first message is used to request whether a slice SLA has been signed for each of at least one slice, and the first message includes identification information of the at least one slice.

In a possible implementation, the processing unit sends, to the access network device by using the sending unit in a process of establishing a QoS flow corresponding to a service of any one of the at least one slice, indication information (for example, the first indication information or the second indication information) used to indicate whether a slice SLA has been signed for the any slice. For example, the policy management control network element may add the first indication information or the second indication information corresponding to the any slice to a QoS flow establishment request message, and then send the QoS flow establishment request message to the access network device. For example, the sending unit may send the QoS flow establishment request message to the access network device by using a session management function network element and/or an access and mobility management function network element.

In a possible implementation, the sending unit sends the first indication information or the second indication information corresponding to any one of at least two slices to the access network device by using a session management function network element and/or an access and mobility management function network element.

In another possible example, an embodiment of this application further provides a slice information processing apparatus. The slice information processing apparatus may be a policy management control network element or a chip applied to the policy management control network element. The slice information processing apparatus includes a processor and a communications interface. The communications interface is configured to support the slice information processing apparatus in performing the steps of receiving and sending a message/data on the slice information processing apparatus side in any one of the seventh aspect or the possible implementations of the seventh aspect. The processor is configured to support the slice information processing apparatus in performing the step of processing a message/data on the slice information processing apparatus side in any one of the seventh aspect or the possible implementations of the seventh aspect. For specific corresponding steps, refer to the descriptions in any one of the seventh aspect or the possible implementations of the seventh aspect. Details are not described herein again.

Optionally, the communications interface and the processor of the slice information processing apparatus are coupled to each other.

Optionally, the slice information processing apparatus may further include a memory, configured to store code and data. The processor, the communications interface, and the memory are coupled to each other.

According to a ninth aspect, an embodiment of this application provides a service processing method, including: An access network device obtains a priority of each of at least two slices. The access network device prioritizes a user behavior action of a slice with a higher priority, or deprioritizes a user behavior action of a slice with a lower priority, based on the priority of each slice.

In a possible implementation, the at least two slices include a first slice and a second slice, where a priority of the first slice is higher than a priority of the second slice. That the access network device prioritizes a user behavior action of a slice with a higher priority, or deprioritizes a user behavior action of a slice with a lower priority, based on the priority of each slice includes: The access network device prioritizes a user behavior action of the first slice, or deprioritizes a user behavior action of the second slice.

In a possible implementation, the user behavior action includes user access control or user QoS flow management control.

In a possible implementation, the user access control includes user RRC establishment and/or user RRC release; and the user QoS flow management control includes QoS flow establishment of a user service and/or QoS flow quality assurance of a user service.

In a possible implementation, the method provided in this embodiment of this application further includes: The access network device obtains a priority of any one of the at least two slices in a process of establishing a QoS flow corresponding to a service of the any slice.

It should be understood that the access network device receives, from a policy management control network element corresponding to any one of the at least two slices, a QoS flow establishment request message corresponding to a service of a terminal on the any slice, where the QoS flow establishment request message includes a priority of the any slice.

In a possible implementation, the access network device receives the QoS flow establishment request message from the policy management control network element by using a session management function network element and/or an access and mobility management function network element.

In a possible implementation, the method provided in this embodiment of this application further includes: The access network device obtains a priority of any one of the at least two slices from a policy management control network element corresponding to the any slice.

In a possible implementation, the method provided in this embodiment of this application further includes: The access network device receives an updated priority of any one of the at least two slices from a policy management control network element corresponding to the any slice.

In a possible implementation, the method provided in this embodiment of this application further includes: The access network device obtains an updated priority of any slice in a running process of a QoS flow corresponding to the any slice.

For example, the access network device receives, from a policy management control network element corresponding to any slice, a QoS flow update request message corresponding to a service of a terminal on the any slice, where the QoS flow update request message includes an updated priority of the any slice.

In a possible implementation, an updated priority of any slice indicates to deactivate, modify, or delete a priority of the any slice.

In a possible implementation, the first slice is deployed before the second slice.

In a possible implementation, the second slice is a network slice newly deployed by an operation, administration and maintenance network element.

In a possible implementation, the first slice and the second slice are deployed in a same network area.

According to a tenth aspect, an embodiment of this application provides a slice processing method, including: A slice management control network element determines priorities of at least two slices. The slice management control network element sends a priority corresponding to each of the at least two slices to at least one policy management control network element corresponding to each slice.

In a possible implementation, a slice selection function network element separately determines a first priority of a first slice and a first priority of a second slice, where the first slice is deployed before the second slice, the priority of the second slice is lower than the priority of the second slice, the first priority of the first slice is used to control a user behavior action of the first slice, and the first priority of the second slice is used to control a user behavior action of a service in the second slice. The slice selection function network element sends the first priority of the first slice to a first policy management control network element, where the first policy management control network element serves the first slice. The slice selection function network element sends the first priority of the second slice to a second policy management control network element, where the second policy management control network element serves the second slice.

In a possible implementation, the method provided in this embodiment of this application further includes: The slice management control network element sends a first request to a network repository function network element, where the first request includes identification information of any one of the at least two slices. The slice management control network element receives a first response from the network repository function network element, where the first response includes identification information of at least one policy management control network element corresponding to the any slice, and the identification information of the policy management control network element is used to determine the policy management control network element.

In a possible implementation, the at least two slices include a slice for which a slice service level agreement SLA has been signed and a slice for which no slice SLA has been signed, and a priority of the slice for which a slice SLA has been signed is higher than a priority of the slice for which no slice SLA has been signed.

In a possible implementation, the method provided in this embodiment of this application further includes: The slice management control network element determines that first information corresponding to any slice exists on the slice management control network element and that a slice SLA has been signed for the any slice, where the first information includes one or more of identification information, slice level information, network area information, time information, at least one piece of user control information, or at least one piece of service control information, and the slice level information indicates a load level or a congestion level of the slice.

In a possible implementation, the method provided in this embodiment of this application further includes: The slice management control network element determines, based on an operator policy and/or a configuration of any slice, that a slice SLA has been signed for the any slice.

In a possible implementation, the method provided in this embodiment of this application further includes: The slice management control network element determines that second information corresponding to any slice does not exist on the slice management control network element and that no slice SLA has been signed for the any slice, where the second information includes one or more of identification information, slice level information, network area information, time information, at least one piece of user control information, or at least one piece of service control information, and the slice level information indicates a load level or a congestion level of the slice.

In a possible implementation, the method provided in this embodiment of this application further includes: each of the at least one piece of user control information includes network area information and at least one piece of network slice instance information; and the network slice instance information includes identification information and a maximum user quantity of the network slice instance.

In a possible implementation, the method provided in this embodiment of this application further includes: each of the at least one piece of service control information includes network area information and at least one piece of network slice instance information; the network slice instance information includes identification information and at least one piece of service configuration information of the network slice instance; the service configuration information includes a service identifier of the service, a maximum service quantity of the service, and at least one piece of service experience interval information of the service; and the service experience interval information includes a size of the service experience interval, a maximum service quantity of the service experience interval, and at least one set of QoS parameters of the service experience interval.

In a possible implementation, the method provided in this embodiment of this application further includes: The slice management control network element determines that the second slice has been established.

In a possible implementation, the method provided in this embodiment of this application further includes: that the slice management control network element determines that the second slice has been established includes: The slice management control network element determines that one or more of the following information about the second slice exist on the slice management control network element and that the second slice has been established: identification information, network area information, time information, at least one piece of user control information, or at least one piece of service control information.

In a possible implementation, the slice management control network element may further determine, based on an operator policy and/or a configuration of the second slice, that the second slice has been established.

In a possible implementation, the method provided in this embodiment of this application further includes: The slice management control network element sends an updated priority of each slice to the at least one policy management control network element corresponding to each slice.

In a possible implementation, an updated priority of any slice indicates at least one policy management control network element corresponding to the any slice to deactivate, modify, or delete a priority of the any slice.

According to an eleventh aspect, an embodiment of this application provides a slice processing method, including: A policy management control network element obtains a priority of at least one slice (for example, from a slice management control network element), where the policy management control network element serves the at least one slice. The policy management control network element sends the priority of the at least one slice to an access network device.

In a possible implementation, the method provided in this embodiment of this application further includes: The policy management control network element sends the priority of the at least one slice to the access network device in a process of establishing a QoS flow corresponding to a service in the slice.

Specifically, the policy management control network element receives a service establishment request of a terminal in the slice. The policy management control network element sends a QoS flow establishment request message to the access network device, where the QoS flow establishment request message includes a priority of any one of the at least one slice.

In a possible implementation, the policy management control network element sends the QoS flow establishment request message to the access network device by using a session management function network element and/or an access and mobility management function network element.

In a possible implementation, the method provided in this embodiment of this application further includes: The policy management control network element sends a third request to a data analytics function network element, where the third request includes at least one of identification information of the slice, geographical area information of the slice, or network area information of the slice. The policy management control network element receives a third response from the data analytics function network element, where the third response includes identification information of the access network device serving the slice, and the identification information of the access network device is used to determine the access network device.

In a possible implementation, the method provided in this embodiment of this application further includes: The policy management control network element obtains an updated priority of the at least one slice from the slice management control network element.

In a possible implementation, the method provided in this embodiment of this application further includes: The policy management control network element sends the updated priority of the at least one slice to the access network device.

In a possible implementation, the method provided in this embodiment of this application further includes: The policy management control network element sends the updated priority of the at least one slice to the access network device in a process of updating the QoS flow of the service.

In a possible implementation, the method provided in this embodiment of this application further includes: the updated priority of the slice indicates to deactivate, modify, or delete the priority of the slice.

In a possible implementation, the method provided in this embodiment of this application further includes: the priority of the slice is used to control user service QoS flow establishment of the slice and/or service QoS flow quality assurance of the slice.

According to a twelfth aspect, this application provides a slice information processing apparatus. The slice information processing apparatus may implement the method in any one of the ninth aspect or the possible implementations of the ninth aspect, and therefore can also achieve the beneficial effects in any one of the ninth aspect or the possible implementations of the ninth aspect. The slice information processing apparatus may be an access network device, or may be an apparatus that can support the access network device in implementing the method in any one of the ninth aspect or the possible implementations of the ninth aspect, for example, a chip applied to the access network device. The slice information processing apparatus may implement the foregoing method by using software or hardware, or by executing corresponding software by using hardware.

In an example, the slice information processing apparatus includes: an obtaining unit, configured to obtain a priority of each of at least two slices; and a processing unit, configured to: prioritize a user behavior action of a slice with a higher priority, or deprioritize a user behavior action of a slice with a lower priority, based on the priority of each slice.

In a possible implementation, the at least two slices include a first slice and a second slice, where a priority of the first slice is higher than a priority of the second slice. The processing unit is configured to: prioritize a user behavior action of the first slice, or deprioritize a user behavior action of the second slice.

It should be understood that, for content related to the user behavior action, refer to the description in the first aspect. Details are not described herein again.

In a possible implementation, the obtaining unit is configured to obtain a priority of any one of the at least two slices in a process in which the processing unit establishes a QoS flow corresponding to a service of the any slice.

It should be understood that the obtaining unit may receive, from a policy management control network element corresponding to any one of the at least two slices, a QoS flow establishment request message corresponding to a service of a terminal on the any slice, where the QoS flow establishment request message includes a priority of the any slice.

In a possible implementation, the obtaining unit is configured to receive the QoS flow establishment request message from the policy management control network element by using a session management function network element and/or an access and mobility management function network element.

In a possible implementation, the obtaining unit is further configured to obtain a priority of any one of the at least two slices from a policy management control network element corresponding to the any slice.

In a possible implementation, the obtaining unit is further configured to receive an updated priority of any one of the at least two slices from a policy management control network element corresponding to the any slice.

In a possible implementation, the obtaining unit is further configured to obtain an updated priority of any slice in a running process of a QoS flow corresponding to the any slice.

For example, the obtaining unit is further configured to receive, from a policy management control network element corresponding to any slice, a QoS flow update request message corresponding to a service of a terminal on the any slice, where the QoS flow update request message includes an updated priority of the any slice.

In a possible implementation, an updated priority of any slice indicates to deactivate, modify, or delete a priority of the any slice.

In a possible implementation, the first slice is deployed before the second slice.

In a possible implementation, the second slice is a network slice newly deployed by an operation, administration and maintenance network element.

In a possible implementation, the first slice and the second slice are deployed in a same network area.

In another possible example, an embodiment of this application further provides a slice information processing apparatus. The slice information processing apparatus may be an access network device or a chip applied to the access network device. The slice information processing apparatus includes a processor and a communications interface. The communications interface is configured to support the slice information processing apparatus in performing the steps of receiving and sending a message/data on the slice information processing apparatus side in any one of the ninth aspect or the possible implementations of the ninth aspect. The processor is configured to support the slice information processing apparatus in performing the step of processing a message/data on the slice information processing apparatus side in any one of the ninth aspect or the possible implementations of the ninth aspect. For specific corresponding steps, refer to the descriptions in any one of the ninth aspect or the possible implementations of the ninth aspect. Details are not described herein again.

Optionally, the communications interface and the processor of the slice information processing apparatus are coupled to each other.

Optionally, the slice information processing apparatus may further include a memory, configured to store code and data. The processor, the communications interface, and the memory are coupled to each other.

According to a thirteenth aspect, an embodiment of this application provides a slice information processing apparatus. The slice information processing apparatus may implement the method in any one of the tenth aspect or the possible implementations of the tenth aspect, and therefore can also achieve the beneficial effects in any one of the tenth aspect or the possible implementations of the tenth aspect. The slice information processing apparatus may be a slice management control network element, or may be an apparatus that can support the slice management control network element in implementing the method in any one of the tenth aspect or the possible implementations of the tenth aspect, for example, a chip applied to the slice management control network element. The slice information processing apparatus may implement the foregoing method by using software or hardware, or by executing corresponding software by using hardware.

In an example, the slice information processing apparatus provided in the thirteenth aspect includes: a determining unit, configured to determine priorities of at least two slices; and a sending unit, configured to send a priority corresponding to each of the at least two slices to at least one policy management control network element corresponding to each slice.

In a possible implementation, the determining unit is configured to separately determine a first priority of a first slice and a first priority of a second slice, where the first slice is deployed before the second slice, the priority of the second slice is lower than the priority of the second slice, the first priority of the first slice is used to control a user behavior action of the first slice, and the first priority of the second slice is used to control a user behavior action of a service in the second slice. The sending unit is configured to: send the first priority of the first slice to a first policy management control network element, where the first policy management control network element serves the first slice; and send the first priority of the second slice to a second policy management control network element, where the second policy management control network element serves the second slice.

In a possible implementation, the sending unit is configured to send a first request to a network repository function network element, where the first request includes identification information of any one of the at least two slices. The apparatus further includes a receiving unit, configured to receive a first response from the network repository function network element, where the first response includes identification information of at least one policy management control network element corresponding to the any slice, and the identification information of the policy management control network element is used to determine the policy management control network element.

In a possible implementation, the at least two slices include a slice for which a slice service level agreement SLA has been signed and a slice for which no slice SLA has been signed, and a priority of the slice for which a slice SLA has been signed is higher than a priority of the slice for which no slice SLA has been signed.

In a possible implementation, the determining unit is configured to determine that first information corresponding to any slice exists and that a slice SLA has been signed for the any slice, where the first information includes one or more of identification information, slice level information, network area information, time information, at least one piece of user control information, or at least one piece of service control information, and the slice level information indicates a load level or a congestion level of the slice.

In a possible implementation, the determining unit is further configured to determine, based on an operator policy and/or a configuration of any slice, that a slice SLA has been signed for the any slice.

In a possible implementation, the determining unit is configured to determine that second information corresponding to any slice does not exist and that no slice SLA has been signed for the any slice, where the second information includes one or more of identification information, slice level information, network area information, time information, at least one piece of user control information, or at least one piece of service control information, and the slice level information indicates a load level or a congestion level of the slice.

For example, in this embodiment of this application, a priority of a slice for which no slice SLA has been signed may be set to be lower than a priority of a slice for which a slice SLA has been signed.

For related content of the user control information and the service control information, refer to the descriptions in the second aspect. Details are not described herein again.

In a possible implementation, the determining unit is further configured to determine that the second slice has been established.

In a possible implementation, the determining unit determines that one or more of the following information about the second slice exist and that the second slice has been established: identification information, network area information, time information, at least one piece of user control information, or at least one piece of service control information.

In a possible implementation, the determining unit may further determine, based on an operator policy and/or a configuration of the second slice, that the second slice has been established.

In a possible implementation, the sending unit is further configured to send an updated priority of each slice to the at least one policy management control network element corresponding to each slice.

In a possible implementation, an updated priority of any slice indicates at least one policy management control network element corresponding to the any slice to deactivate, modify, or delete a priority of the any slice.

In another possible example, an embodiment of this application further provides a slice information processing apparatus. The slice information processing apparatus may be a slice management control network element or a chip applied to the slice management control network element. The slice information processing apparatus includes a processor and a communications interface. The communications interface is configured to support the slice information processing apparatus in performing the steps of receiving and sending a message/data on the slice information processing apparatus side in any one of the tenth aspect or the possible implementations of the tenth aspect. The processor is configured to support the slice information processing apparatus in performing the step of processing a message/data on the slice information processing apparatus side in any one of the tenth aspect or the possible implementations of the tenth aspect. For specific corresponding steps, refer to the descriptions in any one of the tenth aspect or the possible implementations of the tenth aspect. Details are not described herein again.

Optionally, the communications interface and the processor of the slice information processing apparatus are coupled to each other.

Optionally, the slice information processing apparatus may further include a memory, configured to store code and data. The processor, the communications interface, and the memory are coupled to each other.

According to a fourteenth aspect, an embodiment of this application provides a slice information processing apparatus. The slice information processing apparatus may implement the method in any one of the eleventh aspect or the possible implementations of the eleventh aspect, and therefore can also achieve the beneficial effects in any one of the eleventh aspect or the possible implementations of the eleventh aspect. The slice information processing apparatus may be a policy management control network element, or may be an apparatus that can support the policy management control network element in implementing the method in any one of the eleventh aspect or the possible implementations of the eleventh aspect, for example, a chip applied to the policy management control network element. The slice information processing apparatus may implement the foregoing method by using software or hardware, or by executing corresponding software by using hardware.

In an example, the slice information processing apparatus includes: an obtaining unit, configured to obtain a priority of each of at least one slice, where the policy management control network element serves the at least one slice; and a sending unit, configured to send the priority of the at least one slice to an access network device.

In a possible implementation, the sending unit is configured to send the priority of the at least one slice to the access network device in a process of establishing a QoS flow corresponding to a service in the slice.

Specifically, the slice information processing apparatus further includes a receiving unit, configured to receive a service establishment request of a terminal in a slice. The sending unit is configured to send a QoS flow establishment request message to the access network device, where the QoS flow establishment request message includes a priority of any slice.

In a possible implementation, the sending unit sends the QoS flow establishment request message to the access network device by using a session management function network element and/or an access and mobility management function network element.

In a possible implementation, the sending unit is configured to send a third request to a data analytics function network element, where the third request includes at least one of identification information of the slice, geographical area information of the slice, or network area information of the slice. The receiving unit is configured to receive a third response from the data analytics function network element, where the third response includes identification information of the access network device serving the slice, and the identification information of the access network device is used to determine the access network device.

In a possible implementation, the obtaining unit is configured to obtain an updated priority of the slice from the slice management control network element.

In a possible implementation, the sending unit is further configured to send the updated priority of the slice to the access network device.

In a possible implementation, the sending unit is configured to send the updated priority of the slice to the access network device in a process of updating the QoS flow of the service.

In a possible implementation, the updated priority of the slice indicates to deactivate, modify, or delete the priority of the slice.

In a possible implementation, the priority of the slice is used to control user service QoS flow establishment of the slice and/or service QoS flow quality assurance of the slice.

In another possible example, an embodiment of this application further provides a slice information processing apparatus. The slice information processing apparatus may be a policy management control network element or a chip applied to the policy management control network element. The slice information processing apparatus includes a processor and a communications interface. The communications interface is configured to support the slice information processing apparatus in performing the steps of receiving and sending a message/data on the slice information processing apparatus side in any one of the eleventh aspect or the possible implementations of the eleventh aspect. The processor is configured to support the slice information processing apparatus in performing the step of processing a message/data on the slice information processing apparatus side in any one of the eleventh aspect or the possible implementations of the eleventh aspect. For specific corresponding steps, refer to the descriptions in any one of the eleventh aspect or the possible implementations of the eleventh aspect. Details are not described herein again.

Optionally, the communications interface and the processor of the slice information processing apparatus are coupled to each other.

Optionally, the slice information processing apparatus may further include a memory, configured to store code and data. The processor, the communications interface, and the memory are coupled to each other.

According to a fifteenth aspect, an embodiment of this application provides a computer-readable storage medium. The computer-readable storage medium stores a computer program or an instruction. When the computer program or the instruction is run on a computer, the computer is enabled to perform the slice information processing method in any one of the first aspect or the possible implementations of the first aspect.

According to a sixteenth aspect, an embodiment of this application provides a computer-readable storage medium. The computer-readable storage medium stores a computer program or an instruction. When the computer program or the instruction is run on a computer, the computer is enabled to perform the slice information processing method in any one of the second aspect or the possible implementations of the second aspect.

According to a seventeenth aspect, an embodiment of this application provides a computer-readable storage medium. The computer-readable storage medium stores a computer program or an instruction. When the computer program or the instruction is run on a computer, the computer is enabled to perform the slice information processing method in any one of the fifth aspect or the possible implementations of the fifth aspect.

According to an eighteenth aspect, an embodiment of this application provides a computer-readable storage medium. The computer-readable storage medium stores a computer program or an instruction. When the computer program or the instruction is run on a computer, the computer is enabled to perform the service processing method in any one of the seventh aspect or the possible implementations of the seventh aspect.

According to a nineteenth aspect, an embodiment of this application provides a computer-readable storage medium. The computer-readable storage medium stores a computer program or an instruction. When the computer program or the instruction is run on a computer, the computer is enabled to perform the service processing method in any one of the ninth aspect or the possible implementations of the ninth aspect.

According to a twentieth aspect, an embodiment of this application provides a computer-readable storage medium. The computer-readable storage medium stores a computer program or an instruction. When the computer program or the instruction is run on a computer, the computer is enabled to perform the slice processing method in any one of the tenth aspect or the possible implementations of the tenth aspect.

According to a twenty-first aspect, an embodiment of this application provides a computer-readable storage medium. The computer-readable storage medium stores a computer program or an instruction. When the computer program or the instruction is run on a computer, the computer is enabled to perform the slice processing method in any one of the eleventh aspect or the possible implementations of the eleventh aspect.

According to a twenty-second aspect, this application provides a computer program product including an instruction. When the computer program product is run on a computer, the computer is enabled to perform one or more of the first aspect or the possible implementations of the first aspect.

According to a twenty-third aspect, this application provides a computer program product including an instruction. When the computer program product is run on a computer, the computer is enabled to perform one or more of the second aspect or the possible implementations of the second aspect.

According to a twenty-fourth aspect, this application provides a computer program product including an instruction. When the computer program product is run on a computer, the computer is enabled to perform one or more of the fifth aspect or the possible implementations of the fifth aspect.

According to a twenty-fifth aspect, this application provides a computer program product including an instruction. When the computer program product is run on a computer, the computer is enabled to perform one or more of the seventh aspect or the possible implementations of the seventh aspect.

According to a twenty-sixth aspect, this application provides a computer program product including an instruction. When the computer program product is run on a computer, the computer is enabled to perform one or more of the ninth aspect or the possible implementations of the ninth aspect.

According to a twenty-seventh aspect, this application provides a computer program product including an instruction. When the computer program product is run on a computer, the computer is enabled to perform one or more of the tenth aspect or the possible implementations of the tenth aspect.

According to a twenty-eighth aspect, this application provides a computer program product including an instruction. When the computer program product is run on a computer, the computer is enabled to perform one or more of the eleventh aspect or the possible implementations of the eleventh aspect.

According to a twenty-ninth aspect, this application provides a chip. The chip includes a processor and an interface circuit. The interface circuit is coupled to the processor. The processor is configured to run a computer program or an instruction, to implement one or more of the first aspect or the possible implementations of the first aspect.

According to a thirtieth aspect, this application provides a chip. The chip includes a processor and an interface circuit. The interface circuit is coupled to the processor. The processor is configured to run a computer program or an instruction, to implement one or more of the second aspect or the possible implementations of the second aspect.

According to a thirty-first aspect, this application provides a chip. The chip includes a processor and an interface circuit. The interface circuit is coupled to the processor. The processor is configured to run a computer program or an instruction, to implement one or more of the fifth aspect or the possible implementations of the fifth aspect.

According to a thirty-second aspect, this application provides a chip. The chip includes a processor and an interface circuit. The interface circuit is coupled to the processor. The processor is configured to run a computer program or an instruction, to implement one or more of the seventh aspect or the possible implementations of the seventh aspect.

According to a thirty-third aspect, this application provides a chip. The chip includes a processor and an interface circuit. The interface circuit is coupled to the processor. The processor is configured to run a computer program or an instruction, to implement one or more of the ninth aspect or the possible implementations of the ninth aspect.

According to a thirty-fourth aspect, this application provides a chip. The chip includes a processor and an interface circuit. The interface circuit is coupled to the processor. The processor is configured to run a computer program or an instruction, to implement one or more of the tenth aspect or the possible implementations of the tenth aspect.

According to a thirty-fifth aspect, this application provides a chip. The chip includes a processor and an interface circuit. The interface circuit is coupled to the processor. The processor is configured to run a computer program or an instruction, to implement one or more of the eleventh aspect or the possible implementations of the eleventh aspect.

Optionally, the chip described above in this application may further include at least one memory. The at least one memory stores an instruction or a computer program.

According to a thirty-sixth aspect, an embodiment of this application provides a communications system. The communications system includes the slice information processing apparatus in any one of the third aspect or the possible implementations of the third aspect, for example, the slice information processing apparatus in any one of the third aspect or the possible implementations of the third aspect, and the slice information processing apparatus in any one of the sixth aspect or the possible implementations of the sixth aspect. In addition, the communications system may further include the slice information processing apparatus in any one of the eighth aspect or the possible implementations of the eighth aspect.

According to a thirty-seventh aspect, an embodiment of this application provides a communications system. The communications system includes the slice information processing apparatus in any one of the twelfth aspect or the possible implementations of the twelfth aspect, for example, the slice information processing apparatus in any one of the thirteenth aspect or the possible implementations of the thirteenth aspect, and the slice information processing apparatus in any one of the fourteenth aspect or the possible implementations of the fourteenth aspect.

According to a thirty-eighth aspect, an embodiment of this application provides a slice information processing apparatus. The slice information processing apparatus includes one or more modules, configured to implement the method in any one of the first aspect, the second aspect, the fifth aspect, the seventh aspect, the ninth aspect, the tenth aspect, or the eleventh aspect. The one or more modules may correspond to the steps of the method in the first aspect, the second aspect, the fifth aspect, the seventh aspect, the ninth aspect, the tenth aspect, or the eleventh aspect.

According to a thirty-ninth aspect, this application provides a communications apparatus. The apparatus includes a processor and an interface circuit. The interface circuit is coupled to the processor. The apparatus may further include a memory, configured to store a computer program or an instruction. The processor is configured to execute the computer program or the instruction in the memory, so that the communications apparatus is enabled to perform the steps of the method in the first aspect, the second aspect, the fifth aspect, the seventh aspect, the ninth aspect, the tenth aspect, or the eleventh aspect.

Any apparatus, computer storage medium, computer program product, chip, or communications system provided above is configured to perform the corresponding method provided above. Therefore, for beneficial effects that can be achieved, refer to beneficial effects of a corresponding solution in the corresponding method provided above. Details are not described herein again.

DESCRIPTION OF EMBODIMENTS

Figure 1:
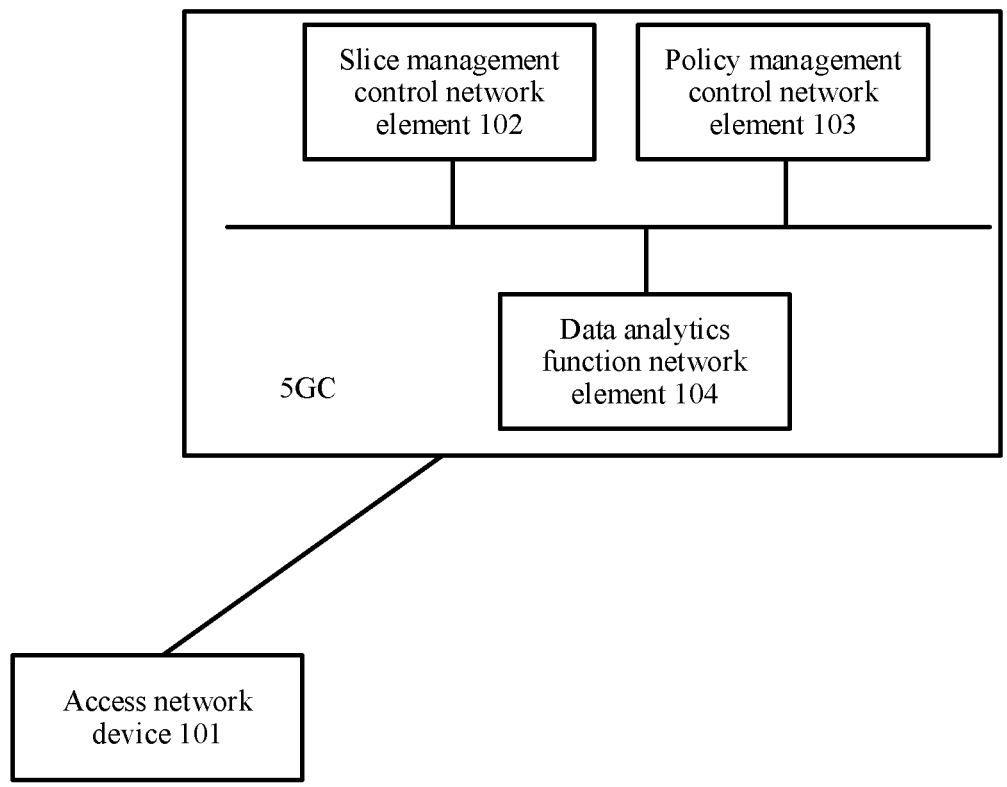
FIG. 1 is a schematic architectural diagram of a communications system according to an embodiment in the present application.

To clearly describe the technical solutions in the embodiments of this application, terms such as "first" and "second" are used in the embodiments of this application to distinguish between same items or similar items that have basically same functions and purposes. For example, a first slice and a second slice are merely used to distinguish between different slices, and do not limit sequences of the first slice and the second slice. A person skilled in the art may understand that the terms such as "first" and "second" do not limit a quantity or an execution sequence, and the terms such as "first" and "second" do not indicate a definite difference.

It should be noted that in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a related concept in a specific manner.

A network architecture and a service scenario described in the embodiments of this application are intended to describe the technical solutions in the embodiments of this application more clearly, and do not constitute a limitation on the technical solutions provided in the embodiments of this application. A person of ordinary skill in the artmay know that, with evolution of network architectures and emergence of new service scenarios, the technical solutions provided in the embodiments of this application are also applicable to similar technical problems.

In this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one of the following" or a similar expression thereof indicates any combination of the following, including any combination of one or more of the following. For example, at least one of a, b, or c may indicate: a, b, c, a and b, a and c, b and c, or a, b, and c, where a, b, and c may be singular or plural.

The technical solutions in the embodiments of this application may be applied to various communications systems with slices, for example, a 5G communications system, which may also be referred to as a new radio (NR) system. NR is a next-generation communications system under research. In addition, the communications systems may be further applied to a future-oriented communications technology, and are all applicable to the technical solutions provided in the embodiments of this application.

A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of network architectures and emergence of new service scenarios, the technical solutions provided in the embodiments of this application are also applicable to similar technical problems. The embodiments of this application are described by using an example in which a provided method is applied to an NR system or a 5G network.

FIG. 1 is a schematic architectural diagram of a communications system to which a slice information processing method is applied according to an embodiment of this application. As shown in FIG. 1, the communications system includes an access network device 101, a slice management control network element 102, at least one policy management control network element 103, and a data analytics function network element 104.

When a terminal accesses a network by using the access network device 101, a network element (for example, a network slice selection function (NSSF) network element) in a 5G core network (5GC) allocates one or more slices to the terminal. Each slice may include one or more of a UPF network element, an SMF network element, an NRF network element, and a PCF network element. The plurality of slices may share some network functions. A set of shared network functions may be referred to as a common control network function (CCNF). For example, the CCNF includes one or more of an AMF network element and an NSSF network element. Each slice corresponds to at least one policy management control network element 103.

It should be understood that the access network device 101 accesses a core network by using a mobility management network element. In 5G, the mobility management network element may be an AMF network element.

It should be understood that the slice management control network element 102, the at least one policy management control network element 103, and the data analytics function network element 104 each may be a network element in the 5GC or a network element in a network management system. For example, the slice management control network element 102 or the policy management control network element 103 may be an NSSF network element, a network repository function (NRF) network element, a policy control function (PCF) network element, a session management function (SMF) network element, or an access and mobility management function (AMF) network element in the 5GC, or may be a network slice selection function (NSMF) network element, a radio access network slice subnet management function (RAN-NSSMF) network element, a core network slice subnet management function (CN-NSSMF) network element, or a transport network slice subnet management function (TN-NSSMF) network element in the network management system. The data analytics function network element 104 may be a network data analytics function (NWDAF) network element in the 5GC, may be a management data analytics function (MDAF) network element in the network management system, or may even be a data analytics function network element on a RAN side. The NRF network element may also be referred to as a network element discovery function network element.

In this embodiment of this application, the policy management control network element 103 is one or more of control plane network elements in the core network. For example, the policy management control network element 103 may be any one of the SMF network element and the PCF network element.

In a possible implementation, one or more of the slice management control network element 102, the at least one policy management control network element 103, and the data analytics function network element 104 may be virtual network elements, and the network elements may communicate with each other through a service-oriented operation. In another possible implementation, one or more of the slice management control network element 102, the at least one policy management control network element 103, and the data analytics function network element 104 may be physical network elements, and the network elements are connected to each other through an existing standardized interface.

For example, if the communications system is applied to a 5G network, as shown in FIG. 1, a network element corresponding to the data analytics function network element 104 may be an NWDAF network element. In this embodiment of this application, the slice management control network element 102 is an NSSF network element or an NSMF network element. The policy management control network element 103 may be an SMF network element or a PCF network element.

For example, the slice management control network element 102 is an NSSF network element, and the policy management control network element 103 may be a PCF network element.

The NSMF network element is responsible for entire life cycle management such as creation, activation, running, deactivation, and deletion of a network slice instance (NSI). The NSMF network element receives a network slice order of a customer, and drives, based on a stored network slice template, a virtual orchestration and management function unit and a slice control function entity to create a network slice instance. In a running phase of the network slice instance, the NSMF creates a performance measurement task for the network slice instance, sets a performance measurement threshold, receives performance measurement data, and receives a notification indicating that the performance measurement data exceeds the threshold. The performance measurement task includes measurement of a key service indicator of the network slice instance and measurement of a virtual resource (VR) used for the network slice instance. Specifically, a slice includes several parts such as a radio access network, a transport network, and a core network. Each part may be considered as a subnet of the slice, and correspondingly, a network slice subnet management function (NSSMF) is responsible for managing the part. The NSMF receives a network slice requirement (including a network slice subnet requirement) generated by a communications service management function (CSMF) based on a service requirement of the customer; converts the received network slice requirement into a network slice subnet requirement, and sends the network slice subnet requirement to a network slice subnet management function (NSSMF). The NSMF converts the network slice subnet requirement into a network slice instance requirement that needs to be deployed, and sends the network slice instance requirement to a MANO. After the MANO connects VNF instances, the NSMF directly or indirectly configures a service on the VNF instance (that is, a network function entity that can run) by using an NFMF, so that a service required by the customer order can be run on the slice properly. In this way, a network slice is created.

Slicing refers to customization of different logical networks on a physical or virtual network infrastructure based on different service requirements. A slice may be a complete end-to-end network that includes a terminal, an access network, a transport network, a core network, and an application server, can provide a complete communication service, and has a specific network capability. The network slice may be a communication resource that ensures that a bearer service or a service can satisfy a requirement of a service level agreement (SLA), or may be considered as a combination of a network function and a communication resource that are required to complete a communication service or some communication services.

A network slice instance (NSI) is a really operating logical network, and can satisfy a network feature or a service requirement. A complete network slice instance may provide a complete end-to-end network service, and the network slice instance may include one or more network slice subnet instances (NSSI) and one or more network functions (NF) instances.

Figure 2:
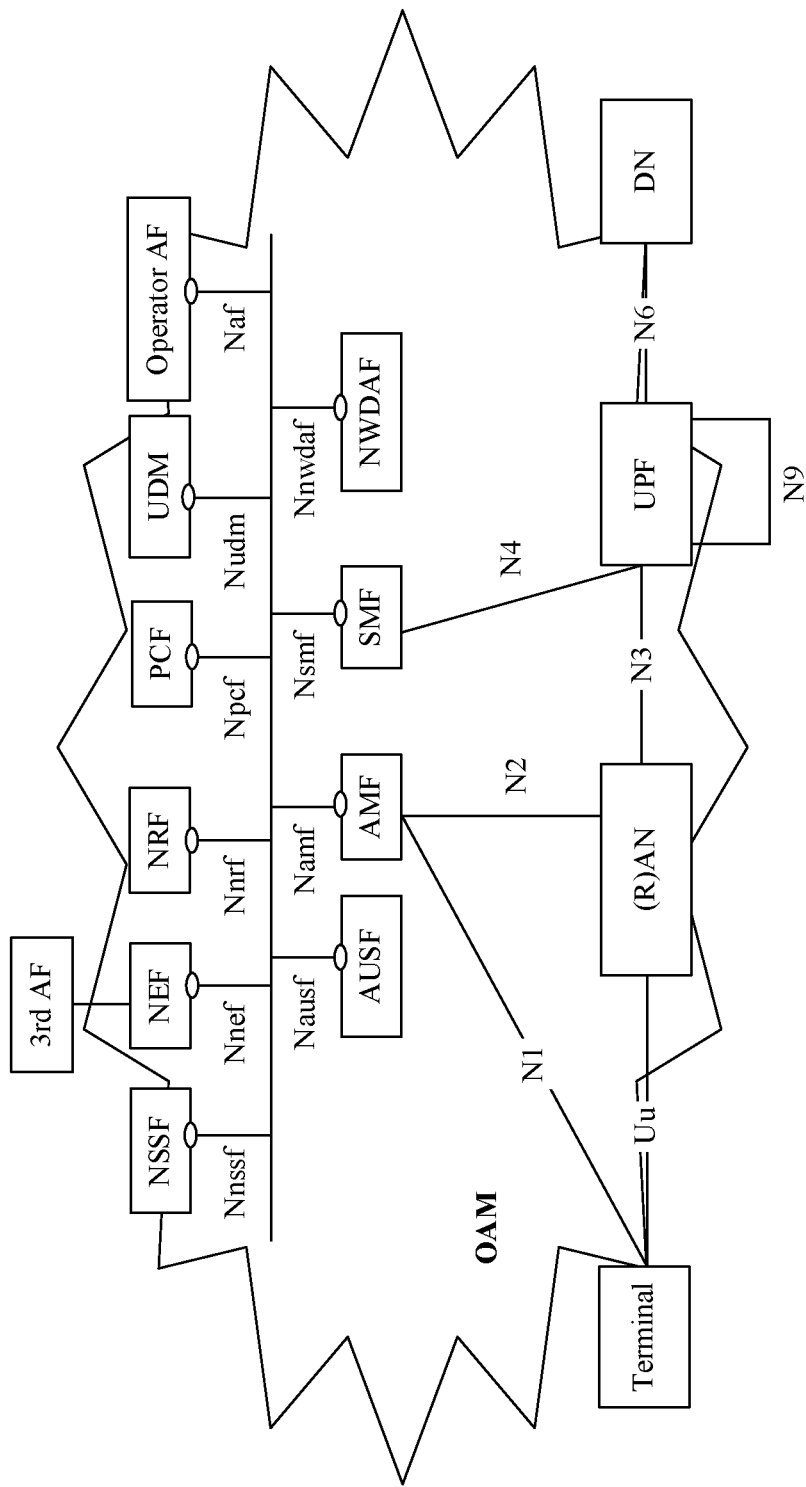
FIG. 2 is a schematic architectural diagram of a 5G network according to an embodiment in the present application.

In addition, as shown in FIG. 2, the 5G network may further include an AMF network element, a user plane function (UPF) network element, an application function (AF) network element, a user plane function (UPF), an access device (for example, an access network (AN)), an authentication server function (AUSF) network element, a network exposure function (NEF) network element, a network repository function (NRF) network element, a data network (DN), an operation, administration, and maintenance (OAM) network element, and the like. This is not specifically limited in this embodiment of this application.

As shown in FIG. 2, the OAM network element may cover network elements in an access network and a core network, and may collect data from these network elements in the access network and the core network.

The terminal communicates with the AMF network element through an N1 interface (N1 for short). The AMF entity communicates with the SMF network element through an N11 interface (N11 for short). The SMF network element communicates with one or more UPF network elements through an N4 interface (N4 for short). Any two of the one or more UPF network elements communicate with each other through an N9 interface (N9 for short). The UPF network element communicates with the data network (DN) through an N6 interface (N6 for short). The terminal accesses a network through the access device (for example, a RAN device), and the access network element communicates with the AMF network element through an N2 interface (N2 for short). The SMF network element communicates with the PCF network element through an N7 interface (N7 for short), and the PCF network element communicates with the AF network element through an N5 interface. The access device communicates with the UPF network element through an N3 interface (N3 for short). Any two AMF network elements communicate with each other through an N14 interface (N14 for short). The SMF network element communicates with the UDM through an N10 interface (N10 for short). The AMF network element communicates with the AUSF through an N12 interface (N12 for short). The AUSF network element communicates with the UDM network element through an N13 interface (N13 for short). The AMF network element communicates with the UDM network element through an N8 interface (N8 for short).

It should be noted that both the 3rd AF network element and the operator AF in FIG. 2 are AF network elements. A difference lies in that the 3rd AF network element (for example, a WeChat service server or an Alipay payment service server) is not controlled by an operator, and the operator AF network element (for example, a proxy-call session control function (P-CSCF) network element in an IP multimedia system) is controlled by an operator. The 3rd AF network element needs to interact with the NWDAF network element through the NEF network element.

It should be noted that names of the interfaces between the network elements in FIG. 2 are merely examples, and the interfaces may have other names during specific implementation. This is not specifically limited in this embodiment of this application.

It should be noted that the access device, the AF network element, the AMF network element, the SMF network element, the AUSF network element, the UDM network element, the UPF network element, the PCF network element, and the like in FIG. 2 are merely names, and the names do not constitute a limitation on the devices. In the 5G network and another future network, the access device, the AF network element, the AMF network element, the SMF network element, the AUSF network element, the UDM network element, the UPF network element, and the PCF network element may have other names. This is not specifically limited in this embodiment of this application. For example, the UDM network element may be replaced with a home subscriber server (HSS), a user subscription database (USD), or a database entity. This is described herein, and details are not described below.

For example, the access device in this embodiment of this application is a device that accesses a core network, for example, a base station, a broadband network gateway (BNG), an aggregation switch, or a non-3rd generation partnership project (3GPP) access device. There may be various forms of base stations, for example, a macro base station, a micro base station (also referred to as a small cell), a relay station, and an access point. For example, the access network device may be a gNB in NR.

For example, in addition to the function of the user plane function network element shown in FIG. 2, the UPF network element in this embodiment of this application may further implement user plane functions of a serving gateway (SGW) and a packet data network gateway (PGW). Alternatively, the UPF network element may be a software-defined networking (SDN) switch. This is not specifically limited in this embodiment of this application.

For example, the AUSF network element in this embodiment of this application is configured to perform authentication on the terminal based on user subscription data of the terminal.

For example, the UDM network element in this embodiment of this application is configured to store user subscription data. In addition, the UDM network element further includes functions such as authentication, user identifier processing, and subscription management. This is not specifically limited in this embodiment of this application.

For example, the PCF network element in this embodiment of this application is further configured to provide a policy rule, and support a policy-related function such as unified policy architecture management network behavior.

Optionally, the user plane function network element in FIG. 2 may be implemented by one device, or may be jointly implemented by a plurality of devices, or may be a logical function module in a device. This is not specifically limited in this embodiment of this application.

A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of network architectures and emergence of new service scenarios, the technical solutions provided in the embodiments of this application are also applicable to similar technical problems. The embodiments of this application are described by using an example in which a provided method is applied to an NR system or a 5G network.

A service may be a communication service that uses a specified SLA and that can be enjoyed by a group of users, for example, a mobile broadband (MBB) service such as voice and internet of things (IOT) services (for example, smart parking and smart metering).

In the prior art, slice SLA assurance is implemented at a network-wide granularity, which does not reflect slice SLA assurance in a specific area. First, in the solution at the network-wide granularity, a large amount of data is involved, a model convergence speed is low, and a data analysis period is long. First, operators are more concerned about slice quality in some areas (such as business centers and railway stations), and slice tenants are more willing to pay for slice quality assurance solutions for these areas.

Figure 3:
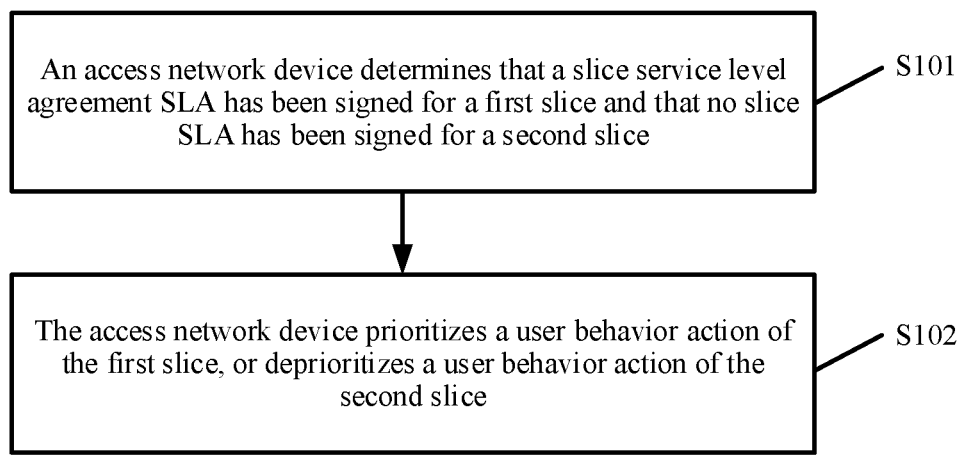
FIG. 3 to FIG. 6 are schematic flowcharts of slice information processing methods according to embodiments of this application.

FIG. 3 is an example of a schematic flowchart of a slice information processing method according to an embodiment of this application. The method includes the following steps.

S101: An access network device determines that a slice service level agreement SLA has been signed for a first slice and that no slice service level agreement SLA has been signed for a second slice.

It should be understood that the first slice and the second slice are any two different slices of a plurality of slices of the access network device.

It should be understood that a slice for which a slice service level agreement SLA has been signed is a slice that has been tested or a slice that has been deployed.

It should be understood that a slice for which no slice service level agreement SLA has been signed is a slice that has not been tested or a slice that has not been deployed. For example, in this embodiment of this application, a slice that has been tested may be a slice that has been drive-tested, and a slice that has not been tested may be a slice that has not been drive-tested.

It should be understood that the access network device may preconfigure that a slice service level agreement SLA has been signed for the first slice and that no slice service level agreement SLA has been signed for the second slice. Alternatively, the access network device may determine, from another network element (for example, a policy management control network element), that a slice service level agreement SLA has been signed for the first slice and that no slice service level agreement SLA has been signed for the second slice. When the access network device determines, from another network element, that a slice service level agreement SLA has been signed for the first slice and that no slice service level agreement SLA has been signed for the second slice, the method provided in this embodiment of this application further includes the following S103 to S106.

S102: The access network device prioritizes a user behavior action of the first slice, or deprioritizes a user behavior action of the second slice.

Specifically, when a cell is congested or an air interface resource is insufficient, the access network device prioritizes user control and/or service control of the first slice, and deprioritizes the user behavior action of the second slice.

The user behavior action includes user access control or user QoS flow management control.

For example, the user access control includes: user RRC establishment and/or user RRC release, preferentially ensuring user RRC establishment of the first slice, rejecting user RRC establishment of the second slice, or releasing established user RRC of the second slice.

The user QoS flow management control includes: user service QoS flow establishment and/or QoS flow quality assurance of a user service, preferentially ensuring QoS flow establishment of a user service of the first slice, rejecting user QoS flow establishment of the second slice, or reducing an air interface resource for an established user QoS flow of the second slice to reduce QoS flow quality. This is mainly to ensure service experience of the first slice for which a slice SLA has been signed.

It should be understood that a user of the first slice may be all terminals that use the first slice, and a user of the second slice may be all terminals that use the second slice.

It should be understood that a quality of service (QoS) flow of a service corresponding to the user of the first slice may be all QoS flows in the first slice, and a QoS flow of a service corresponding to the user of the second slice may be all QoS flows in the second slice.

For example, when RRC of the user of the first slice and radio resource control (RRC) of the user of the second slice need to be established, if the access network device determines that a slice SLA has been signed for the first slice and that no slice SLA has been signed for the second slice, the access network device preferentially establishes radio resource control (RRC) of the user of the first slice.

For example, when the access network device determines that the QoS flow of the service corresponding to the user of the first slice and the QoS flow of the service corresponding to the user of the second slice need to be established, if a slice SLA has been signed for the first slice and no slice SLA has been signed for the second slice, the access network device preferentially establishes the QoS flow of the service corresponding to the user of the first slice. In this way, air interface resource allocation of the QoS flow of the service in the first slice can be preferentially ensured.

In this embodiment of this application, the access network device determines that a slice service level agreement SLA has been signed for the first slice and that no slice service level agreement SLA has been signed for the second slice. In this way, if the access network device has the first slice and the second slice, when the access network device discovers cell congestion, because a slice service level agreement SLA has been signed for the first slice and no slice service level agreement SLA has been signed for the second slice, during initial deployment of the second slice, to avoid affecting a service in the first slice, the access network device satisfies the service in the first slice as much as possible when allocating an air interface resource.

It may be understood that the first slice may be a slice that is first established in an initial network after the initial network is established. A network management system NSMF network element first decomposes a requirement (that is, an SLA of a tenant) for the first slice to slice management network elements, that is, RAN-NSSMF/CN-NSSMF/TN-NSSMF, in different subdomains such as a RAN, a CN, and a TN. Then, the slice management network elements in these subdomains perform slice establishment, that is, perform slice resource isolation on the RAN, the CN, and the TN as required. It should be understood that this process is only initial deployment of the first slice, and the network management system roughly decomposes a requirement of a tenant for a slice based on a requirement of the tenant for the first slice, and deploys the slice.

Figure 4:
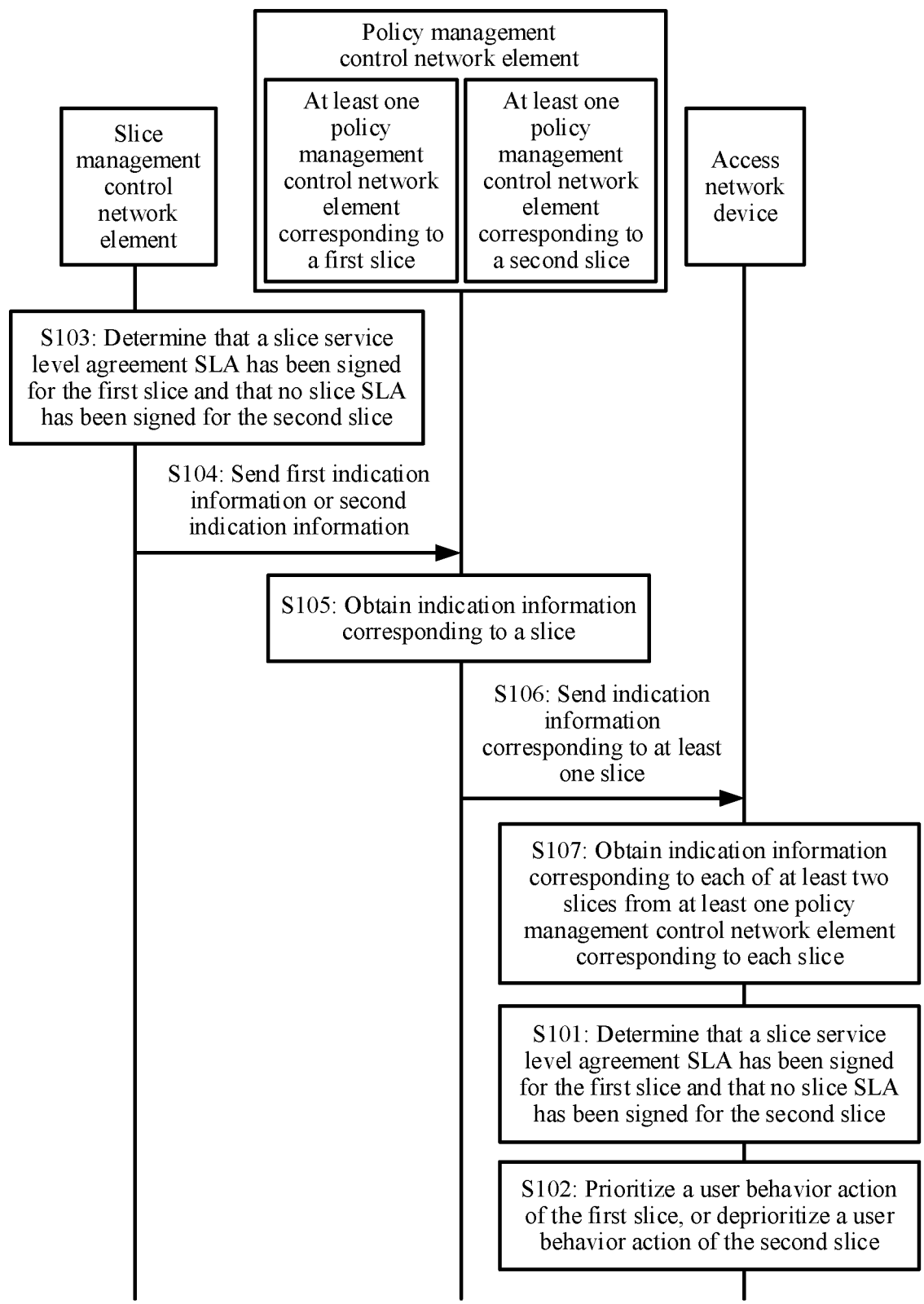

In another embodiment of this application, as shown in FIG. 4, before step S101, this embodiment of this application may further include the following steps.

S103: A slice management control network element determines that a slice service level agreement SLA has been signed for a first slice and that no slice SLA has been signed for a second slice.

For example, when determining that a cell is congested or an air interface resource is insufficient, the slice management control network element performs S103. Alternatively, after receiving, by using a policy management control network element, a request sent by a terminal, the slice management control network element performs S103.

In a possible implementation, S103 provided in this embodiment of this application may be specifically implemented in the following manner: If first information corresponding to the first slice exists on the slice management control network element, the slice management control network element determines that a slice SLA has been signed for the first slice; or if first information corresponding to the second slice does not exist on the slice management control network element, the slice management control network element determines that no slice SLA has been signed for the second slice.

The first information corresponding to the slice includes one or more of identification information, slice level information, network area information, time information, at least one piece of user control information, or at least one piece of service control information. The slice level information indicates a load level or a congestion level of the slice.

For example, each of the at least one piece of user control information includes network area information and at least one piece of network slice instance information. The network slice instance information includes identification information and a maximum user quantity of the network slice instance. For example, each of the at least one piece of service control information includes network area information and at least one piece of network slice instance information. The network slice instance information includes identification information and at least one piece of service configuration information of the network slice instance. The service configuration information includes a service identifier of the service, a maximum service quantity of the service, and at least one piece of service experience interval information of the service. The service experience interval information includes a size of the service experience interval, a maximum service quantity of the service experience interval, and at least one set of QoS parameters of the service experience interval.

After a slice is deployed, a service of the slice starts to run in an initial slice network. In a running process, a data analytics function network element generates a plurality of sets of QoS parameters of each of at least one service corresponding to the slice. Each set of QoS parameters includes one or more of a guaranteed flow bit rate (GFBR), a packet delay budget (PDB), a packet error rate (PER), an average packet loss rate (Max PLR), an average window size (AWS), and the like.

The data analytics function network element may generate the plurality of sets of QoS parameters of each of the at least one service corresponding to the slice in the following steps S11 to S13.

S11: The data analytics function network element may collect service data of a quality of service flow (QoS flow) level from an AF network element, and obtain network data from a network element (for example, a RAN, an AMF network element, an SMF network element, or a UPF network element).

For example, the service data in this application may be data of parameters such as a bandwidth, a delay, a packet loss rate, a jitter buffer, a TCP congestion window, a TCP receive window, a media encoding type, and a media encoding rate.

It may be understood that, in this embodiment of this application, data of a parameter may be a size, a value, or a requirement of the parameter. For example, data of a CQI data may be a size or a value of the CQI. In this embodiment of the present application, data, a size, a value, or a requirement of a parameter indicates a data value collected or obtained by a corresponding network element for the parameter. For all similar descriptions below, refer to the description herein. Details are not described below.

The network data in this application may be data of parameters such as a bandwidth, a delay, a packet loss rate, reference signal received power (RSRP), reference signal received quality (RSRQ), a block error rate (BLER), a channel quality indicator (CQI), slice identification information, and a data network name (DNN).

For example, the service data may be shown in Table 3, and the network data may be shown in Table 4.

For example, the data analytics function network element obtains, from the AF network element, service data corresponding to one or more services such as a video service, a payment service, an automatic driving service, and a vertical service. The data analytics function network element may obtain network data from a 5G NF.

For example, Table 3 shows data content from service experience data of a tenant, and Table 4 shows content of network data from a 5G NF. For details, refer to Table 3 and Table 4.

TABLE 3

Service data from service experience data of a tenant

| Information | Presence | Source | Description |
| --- | --- | --- | --- |
| Correlation identifier (Correlation ID) | M | AF network element | |
| Application ID | M | | Service identifier |
| Geographical area identifier (geographical area ID) | M | | Geographical area |
| Service MOS | M | | |

TABLE 4

Network data from a 5G NF

| Information | Description |
| --- | --- |
| Correlation identifier (Correlation ID) | |
| Application ID | Service identifier |
| Quality of service flowidentifier QFI | Identifier of a quality of service flow |
| Cell ID | Identifier of a cell that provides a service |
| QoS flow bit rate | Parameter of a quality of service flow, for example, a GFBR |
| QoS flow packet delay budget | Parameter of a quality of service flow, for example, a PDB |
| QoS flow packet error rate | Parameter of a quality of service flow, for example, a PER |
| Network data X4 | Network data X4 |
| Network data X5 | Network data X5 |

Step 12: The data analytics function network element analyzes the network data and the service data to obtain a service MOS model of each service in the slice.

Step 13: The data analytics function network element obtains, based on a service requirement (that is, a MOS interval, for example, [3.0, 4.0], [4.0, 4.5], or [4.5, 5.0]) and the service MOS model of each service, at least one set of QoS parameters of different service experience ranges corresponding to each service.

In another possible implementation, S5103 provided in this embodiment of this application may be specifically implemented in the following manner: The slice management control network element may further determine, based on an operator policy and/or a configuration of the first slice, that a slice SLA has been signed for the first slice, or determine, based on an operator policy and/or a configuration of the second slice, that no slice SLA has been signed for the second slice.

S104: The slice management control network element sends first indication information to at least one policy management control network element corresponding to the first slice for which a slice service level agreement SLA has been signed, or the slice management control network element sends second indication information to at least one policy management control network element corresponding to the second slice for which no slice SLA has been signed.

It should be noted that the at least one policy management control network element corresponding to the second slice and the at least one policy management control network element corresponding to the first slice may be different policy management control network elements, or may be a same policy management control network element. Alternatively, some of the at least one policy management control network element corresponding to the second slice are the same as some of the at least one policy management control network element corresponding to the first slice.

It should be understood that, in this embodiment of this application, the slice management control network element may send both the first indication information and the second indication information. Alternatively, the slice management control network element sends the first indication information, but does not send the second indication information. Alternatively, the slice management control network element does not send the first indication information, but sends the second indication information.

The first slice is a slice that is in at least two slices and for which a slice service level agreement SLA has been signed, and the second slice is a slice that is in the at least two slices and for which no slice service level agreement SLA has been signed.

For example, at least one policy management control network element corresponding to a slice is configured to serve at least one of service control and user access control of the slice. For example, at least one policy management control network element corresponding to a slice is configured to control service QoS flow establishment and service QoS flow management (for example, service QoS flow update and service QoS flow deletion) of the slice.

The first indication information indicates that a slice service level agreement SLA has been signed for the slice, and the second indication information indicates that no slice service level agreement SLA has been signed for the slice.

It should be understood that the slice management control network element may send indication information (the first indication information or the second indication information) corresponding to the at least two slices to at least one policy management control network element corresponding to each slice. In this case, the slice management control network element may send identification information of the slice to the at least one policy management control network element corresponding to each slice. In this way, when receiving the indication information corresponding to the at least two slices, the at least one policy management control network element may determine, based on the identification information of the slice, that indication information corresponding to a slice served by the at least one policy management control network element is the first indication information or the second indication information.

It should be understood that there may be a common policy management control network element in at least one policy management control network element corresponding to a plurality of slices in the at least two slices.

For example, a slice 1 corresponds to a PCF 1 and a PCF 2, and a slice 2 corresponds to the PCF 1 and a PCF 3, that is, the PCF 1 corresponding to the slice 1 and the slice 2 are configured to provide services for the slice 1 and the slice 2. In this case, the slice management control network element may send both first indication information corresponding to the slice 1 and second indication information corresponding to the slice 2 to the PCF 1, and then send third indication information corresponding to the slice 1 to the PCF 2 and send fourth indication information corresponding to the slice 2 to the PCF 3. Alternatively, the slice management control network element may send both first indication information corresponding to the slice 1 and second indication information corresponding to the slice 2 to the PCF 1 and the PCF 2, and then send the first indication information corresponding to the slice 1 and the second indication information corresponding to the slice 2 to the PCF 1 and the PCF 3.

It should be understood that, if the slice management control network element determines that a slice service level agreement SLA has been signed for a slice, the slice management control network element may send first indication information corresponding to the slice to at least one policy management control network element corresponding to the slice, or the slice management control network element does not send first indication information corresponding to the slice to at least one policy management control network element corresponding to the slice.

If the slice management control network element determines that no slice service level agreement SLA has been signed for a slice, the slice management control network element may send second indication information corresponding to the slice to at least one policy management control network element corresponding to the slice, or the slice management control network element does not send second indication information corresponding to the slice to at least one policy management control network element corresponding to the slice.

For example, S104 in this embodiment of this application may be implemented in the following manners:

Manner 1: For the first slice for which a slice service level agreement SLA has been signed, the slice management control network element may send the first indication information corresponding to the first slice to the at least one policy management control network element corresponding to the first slice. For the second slice for which no slice service level agreement SLA has been signed, the slice management control network element may send the second indication information corresponding to the second slice to the at least one policy management control network element corresponding to the second slice.

Manner 2: For the first slice for which a slice service level agreement SLA has been signed, the slice management control network element may send the first indication information corresponding to the first slice to the at least one policy management control network element corresponding to the first slice. For the second slice for which no slice service level agreement SLA has been signed, the slice management control network element may not send the second indication information corresponding to the second slice to the at least one policy management control network element corresponding to the second slice.

Manner 3: For the first slice for which a slice service level agreement SLA has been signed, the slice management control network element may not send the first indication information corresponding to the first slice to the at least one policy management control network element corresponding to the first slice. For the second slice for which no slice service level agreement SLA has been signed, the slice management control network element may send the second indication information corresponding to the second slice to the at least one policy management control network element corresponding to the second slice.

Specifically, the slice management control network element may negotiate with the policy management control network element about a manner in Manner 1 to Manner 3 to implement S104. Alternatively, the slice management control network element may indicate the policy management control network element not to send the first indication information corresponding to a slice for which an SLA has been signed. Alternatively, the slice management control network element indicates the policy management control network element to send the first indication information corresponding to a slice for which no SLA has been signed.

It should be understood that, before the slice management control network element performs S104, the method provided in this embodiment of this application further includes: The slice management control network element determines at least one policy management control network element corresponding to any one of the at least two slices.

For example, the slice management control network element may determine the at least one policy management control network element corresponding to the any slice in the following manner: The slice management control network element sends a first request to a network repository function network element, where the first request includes identification information of the at least two slices. The slice management control network element receives a first response from the network repository function network element, where the first response includes identification information of the at least one policy management control network element corresponding to the any slice. The identification information of the policy management control network element is used to determine the policy management control network element. Alternatively, if the slice management control network element has a mapping relationship between identification information of a slice and identification information of at least one policy management control network element, the slice management control network element may determine, based on the mapping relationship, at least one policy management control network element corresponding to each slice.

In this embodiment of this application, the identification information of the slice is used to identify the slice. For example, the identification information of the slice may be network slice selection assistance information (NSSAI), single network slice selection assistance information (S-NSSAI), or a network slice instance identifier (NSI ID) of the slice.

S105: The policy management control network element obtains indication information corresponding to a slice.

It should be understood that the slice is a slice served by the policy management control network element.

For example, the slice may be the first slice, and the indication information may be the first indication information.

For example, the slice may be the second slice, and the indication information may be the second indication information.

In other words, the indication information corresponding to the slice in S105 may be the first indication information or the second indication information.

A network side may negotiate with an access network device about a rule about whether indication information is sent for a slice for which a slice SLA has been signed and for a slice for which no slice SLA has been signed. For details, refer to the following.

Rule 1: The first indication information is not sent for a slice for which a slice SLA has been signed, and the second indication information is sent for a slice for which no slice SLA has been signed.

Rule 2: The second indication information is not sent for a slice for which no slice SLA has been signed, and the first indication information is sent for a slice for which a slice SLA has been signed.

Rule 3: The first indication information is sent for a slice for which a slice SLA has been signed, and the second indication information is sent for a slice for which no slice SLA has been signed.

Specifically, for the rule 2 and the rule 3, if the policy management control network element serves the slice for which a slice SLA has been signed, the policy management control network element obtains the first indication information. For the rule 1 and the rule 3, if the policy management control network element serves the slice for which no slice SLA has been signed, the policy management control network element obtains the second indication information.

It should be noted that the slice management control network element may also send the indication information corresponding to the slice to the policy management control network element according to the rule 1 to the rule 3.

It should be understood that, after the slice management control network element sends indication information corresponding to each slice to at least one policy management control network element corresponding to each slice, the at least one policy management control network element corresponding to each slice may obtain the indication information corresponding to each slice. Because functions and purposes of all policy management control network elements in the at least one policy management control network element corresponding to each slice are the same, an example in which there is one policy management control network element in S105 is used for description.

It should be understood that, because each slice corresponds to at least one policy management control network element, when there are a plurality of slices, there may be two or more slices that correspond to a common policy management control network element in the plurality of slices. If one policy management control network element corresponds to at least one slice, the policy management control network element may obtain indication information corresponding to each of the at least one slice.

S106: The policy management control network element sends indication information corresponding to at least one slice to the access network device.

For specific implementation of S106, refer to the rules shown in the foregoing rule 1 to rule 3.

Example 1: The at least one slice includes a slice for which a slice SLA has been signed. In this case, the indication information corresponding to the one slice may be the first indication information.

Example 2: The at least one slice includes a slice for which no slice SLA has been signed. In this case, the indication information corresponding to the one slice may be the second indication information.

Example 3: If the policy management control network element serves at least two slices, and the at least two slices include a slice for which a slice SLA has been signed and a slice for which no slice SLA has been signed, the at least one slice in S106 includes a slice for which no slice SLA has been signed and a slice for which a slice SLA has been signed. In this case, the slice for which the slice SLA has been signed corresponds to the first indication information, and the slice for which no slice SLA has been signed corresponds to the second indication information. Alternatively, the slice for which a slice SLA has been signed corresponds to the first indication information, and the slice for which no slice SLA has been signed corresponds to the second indication information.

It should be understood that, when receiving indication information corresponding to at least one slice corresponding to each policy management control network element, each policy management control network element may send the indication information corresponding to the at least one slice corresponding to each policy management control network element to the access network device.

In a possible implementation 1, S106 may be implemented in the following manner: The policy management control network element may send the indication information corresponding to the slice to the access network device in a process of establishing a QoS flow corresponding to a service of the slice.

For the first slice, the policy management control network element may send the first indication information corresponding to the first slice to the access network device in a process of establishing a QoS flow corresponding to a service of the first slice. For the second slice, the policy management control network element may send the second indication information corresponding to the second slice to the access network device in a process of establishing a QoS flow corresponding to a service of the second slice.

The following should be noted: Manner 1: When the network side negotiates with the access network device not to send the first indication information corresponding to the slice for which a slice SLA has been signed, if the policy management control network element serves the second slice, the policy management control network element may send the second indication information corresponding to the second slice to the access network device in the process of establishing the QoS flow corresponding to the service of the second slice.

Manner 2: When the network side negotiates with the access network device not to send the second indication information corresponding to the slice for which no slice SLA has been signed, if the policy management control network element serves the first slice, the policy management control network element may send the first indication information corresponding to the first slice to the access network device in the process of establishing the QoS flow corresponding to the service of the first slice.

If the network side negotiates with the access network device that a sending rule is the rule 3, the policy management control network element serving each slice may send the first indication information and the second indication information to the access network device in the foregoing manner 1 and manner 2.

Specifically, the policy management control network element may send the indication information corresponding to the slice to the access network device by using a session management network element and/or an access and mobility management function network element in the process of establishing the QoS flow corresponding to the service of the slice.

For example, the policy management control network element sends the indication information corresponding to the at least one slice to the access network device by using a session management network element and/or an access and mobility management function network element.

Specifically, when the policy management control network element is a session management network element, the policy management control network element sends the indication information corresponding to the at least one slice to the access network device by using an access and mobility management function network element.

Alternatively, when the policy management control network element is a policy control network element, the policy management control network element sends the indication information corresponding to the at least one slice to the access network device by using a session management network element. Then, after receiving the indication information corresponding to the at least one slice, the session management network element sends the indication information corresponding to the at least one slice to the access network device by using an access and mobility management function network element.

It should be understood that, when sending the indication information corresponding to the at least one slice to the access network device, the policy management control network element further needs to send identification information of the access network device to the session management network element and/or the access and mobility management function network element. Therefore, when receiving the indication information corresponding to the at least one slice, the session management network element and/or the access and mobility management function network element may determine to send the indication information corresponding to the at least one slice to the access network device indicated by the identification information of the access network device.

For example, the process in which the policy management control network element establishes the QoS flow corresponding to the service of the slice is as follows: The policy management control network element receives a service establishment request of the terminal on the slice by using the access and mobility management function network element. The policy management control network element sends a QoS flow establishment request message corresponding to the service to the access network device, where the QoS flow establishment request message includes indication information corresponding to the slice. Alternatively, the policy management control network element sends, to the terminal in the process of establishing the QoS flow corresponding to the service, a message that carries indication information corresponding to the slice. The message may be a newly defined message, or may be a message in the process of establishing the QoS flow corresponding to the service. This is not limited in this embodiment of this application.

It should be understood that the policy management control network element sends the QoS flow establishment request message to the access network device by using the session management network element and/or the access and mobility management function network element.

In another possible implementation 2, S106 may be implemented in the following manner: The policy management control network element sends the indication information corresponding to each of the at least one slice to the access network device.

Specifically, the policy management control network element may send the indication information corresponding to each of the at least one slice to the access network device at a device level, or may send the indication information corresponding to each of the at least one slice at a QoS flow level. For a specific procedure, refer to step S107.

S107: The access network device obtains the indication information corresponding to each of the at least two slices from the at least one policy management control network element corresponding to each slice.

Specifically, if S106 is implemented in the possible implementation 1, the access network device obtains the indication information corresponding to each slice from a QoS flow establishment request message corresponding to each slice.

Specifically, if S106 is implemented in the possible implementation 2, the access network device obtains the indication information corresponding to each slice from the policy management control network element corresponding to each slice.

It should be understood that, regardless of a rule in the rule 1 to the rule 3 that is negotiated by the network side and the access network device to send the indication information, for the policy management control network element, the indication information that corresponds to the slice and that is sent by the policy management control network element to the access network device indicates that no slice SLA has been signed or a slice SLA has been signed.

Correspondingly, S101 may be implemented in the following manner:

It should be noted that, if a sending rule negotiated by the network side and the access network device is the rule 3, the access network device determines, based on the first indication information, that a slice service level agreement SLA has been signed for the first slice, and determines, based on the second indication information, that no slice service level agreement SLA has been signed for the second slice.

If a sending rule negotiated by the network side and the access network device is the rule 2, if the access network device obtains the first indication information, the access network device determines that a slice service level agreement SLA has been signed for the first slice; or if the access network device determines that the second slice does not correspond to the second indication information, the access network device determines that no slice service level agreement SLA has been signed for the second slice.

If a sending principle negotiated by the network side and the access network device is the rule 1, if the access network device does not obtain the first indication information corresponding to the first slice, the access network device determines that a slice service level agreement SLA has been signed for the first slice; or if the access network device does not obtain the second indication information corresponding to the second slice, the access network device determines that no slice service level agreement SLA has been signed for the second slice.

For example, the first slice is a slice that has been tested or deployed. The second slice is a slice that has not been tested or deployed.

Figure 5A:
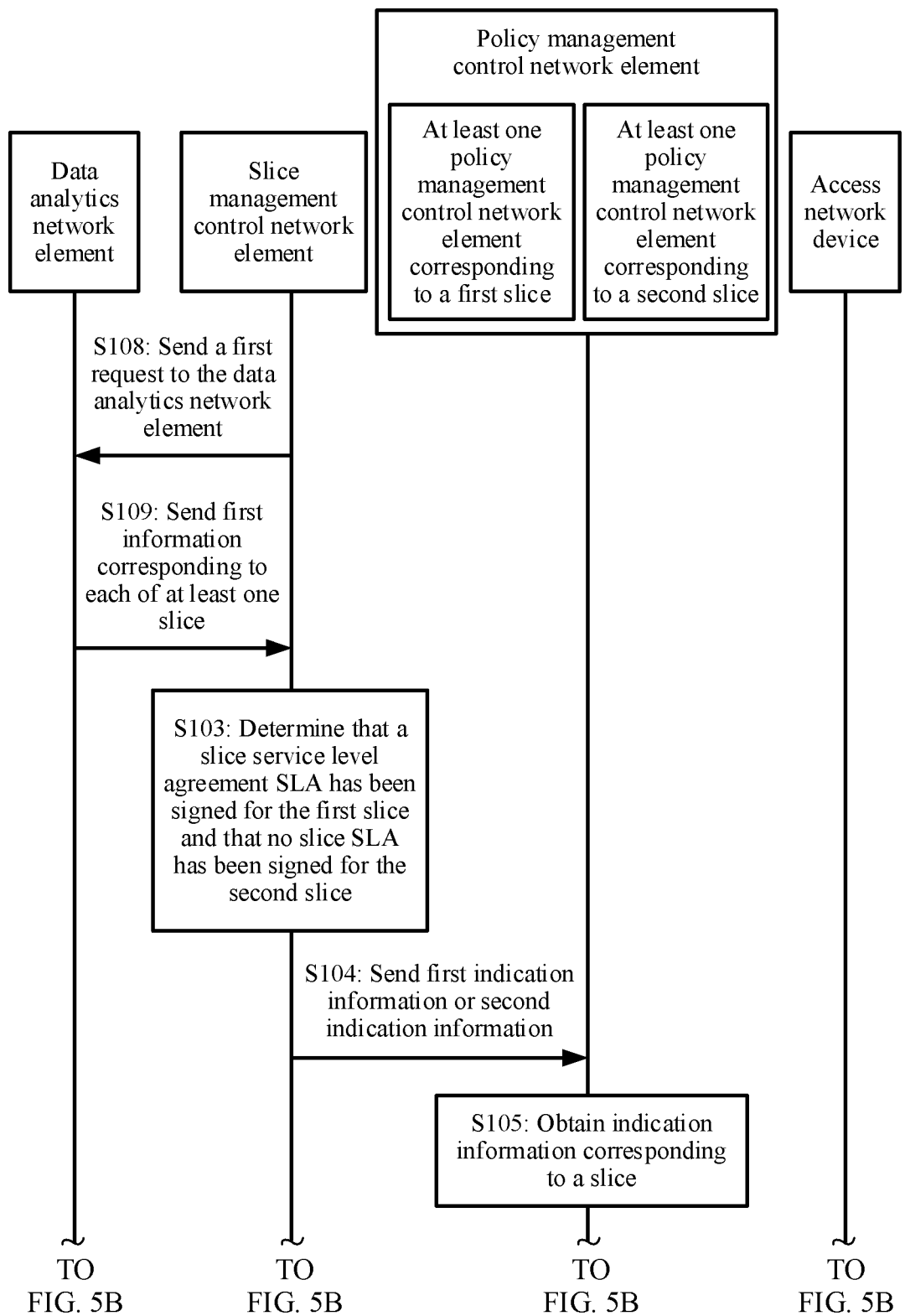
Figure 5B:
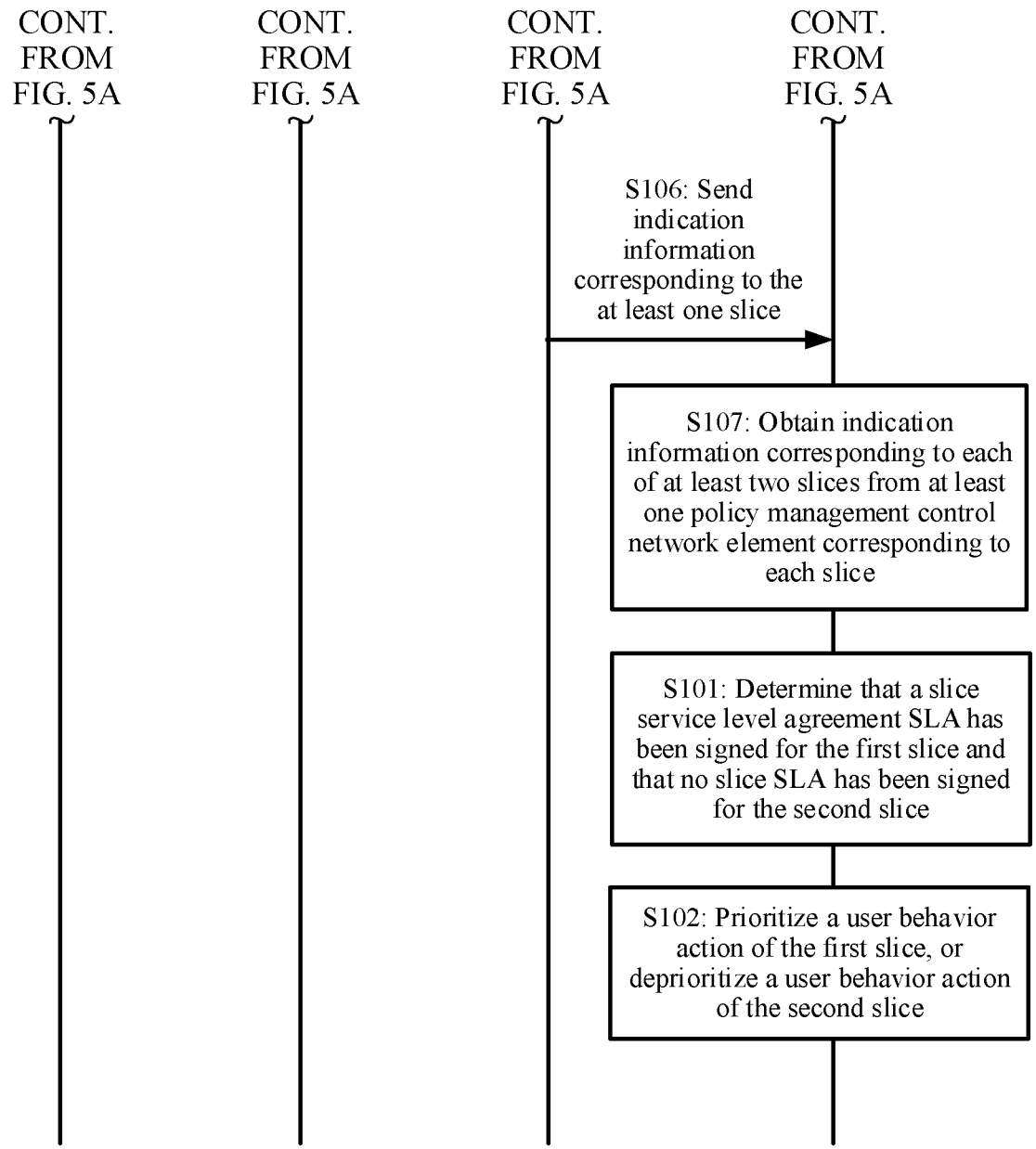

In another possible embodiment of this application, as shown in FIG. 5A and FIG. 5B, before S103, the method provided in this embodiment of this application further includes the following steps.

S108: The slice management control network element sends a first request to the data analytics function network element, where the first request is used to request first information corresponding to the at least one slice, and the first request includes identification information of the at least one slice.

For example, if the slice management control network element receives, from the policy control management network element, a notification that no slice SLA has been signed for the slice, the slice management control network element may perform S108. Alternatively, when network congestion occurs, the slice management network element performs S108.

For example, when obtaining time information, geographical area information, and service requirement information of at least one service of one of the at least one slice, the slice management control network element sends the first request. For the service requirement information, refer to step 109.

It should be understood that the slice management control network element obtains the time information, the geographical area information, and the service requirement information of the at least one service of the slice from an application function (AF) network element or a policy management control network element serving the slice.

S109: The data analytics function network element sends first information corresponding to each of the at least one slice to the slice management control network element, where the first information is used for user access control or user QoS flow management control of the slice.

For example, the first information includes at least one of identification information of the slice, slice level information, time information, network area information, at least one piece of user control information, and at least one piece of service control information. The slice level information indicates a load level or a congestion level of the slice.

It may be understood that the slice management control network element may obtain the first information corresponding to the at least one slice in S108 and S109. Therefore, if the slice management control network element determines that a slice corresponds to the first information, a slice SLA has been signed for the slice. Otherwise, no slice SLA has been signed.

Specifically, the slice management control network element may establish a relationship between the first information corresponding to each slice and a slice identifier of the slice. In this way, the policy management control network element may determine, based on an identifier that is of a requested slice and that is sent by the policy management control network element, whether a slice SLA has been signed for the slice.

Optionally, the first request further includes one or more of the following information about the slice: time information, geographical area information, and service requirement information of at least one service of the slice, and the service requirement information includes a parameter used to indicate a service requirement.

For example, the service requirement information includes a service identifier and one or more of the following information: a first data value of service experience, a first data value of a total service quantity, a first data value of a percentage of services satisfying the first data value of service experience, and network quality requirement information, and the network quality requirement information indicates a network quality parameter required by the service.

For example, the network quality requirement information includes one or more of the following information: a first bandwidth data value, a first delay data value, a first packet loss rate data value, and a first jitter data value.

Correspondingly, the management control function network element receives, from the data analytics function network element, identification information of each of the at least one slice and one or more of the following information corresponding to each slice: geographical area information and service response information of the at least one service. The service response information indicates service information of a slice that can be satisfied by the network.

It should be understood that a first data value of any parameter requested by the service requirement information may be equal to or unequal to a second data value of the any parameter in the service response message.

For example, Table 5 shows content of the information carried in the first request.

TABLE 5

| Information element | Meaning |
| --- | --- |
| NSSAI | Slice identifier |
| Geographical Area ID | Identifier used to identify a geographical area |
| Application monitoring list | Service monitoring list |
| > Application ID | Service identifier |
| > Service MOS requirement | Service experience requirement, for example, MOS ≥ 3.0 |
| > Total service quantity | Total service quantity of the service, for example, ≥10000 |
| > How many percentage UEs' experience satisfy | Percentage of users satisfying the service experience requirement, that is, a quantity of uses using the service satisfying MOS ≥ 3.0 is divided by the total service quantity |
| > Service satisfaction status | Service requirement of a tenant |
| >> Bandwidth | For example, 1.0 MB |
| >> Delay | For example, 90 ms |
| Service MOS percentage requirement | Service MOS percentage requirement ≥ 90% |
| Guaranteed flow bit rate (GFBR) | For example, 2 MB |

For example, Table 6 shows content of the information carried in the first response.

TABLE 6

| Information element | Meaning |
| --- | --- |
| NSSAI | Slice identifier |
| Geographical Area ID | Identifier used to identify a geographical area |
| Application monitoring list | Service monitoring list |
| > Application ID | Service identifier |
| > Service MOS requirement | Service experience requirement, for example, MOS ≥ 3.0 |
| > Total service quantity | Total service quantity of the service, for example, ≥10000 |
| >> Bandwidth | For example, 1.0 MB |
| >> Delay | For example, 90 ms |
| Service MOS percentage requirement | Service MOS percentage requirement ≥ 90% |
| Guaranteed flow bit rate (GFBR) | For example, the GFBR is 2 MB |

For example, the service response information includes a service identifier and one or more of the following information corresponding to the service: a second data value of a total service quantity, a second data value of a percentage of services satisfying a first data value of service experience, and a network quality parameter. The network quality parameter includes one or more of a second bandwidth data value, a second delay data value, a second packet loss rate data value, and a second jitter data value.

In still another possible implementation of this application, S103 provided in this embodiment of this application may be specifically implemented in the following manner:

It should be understood that, when the slice management control network element requests the first request from the data analytics function network element, if the slice management control network element determines that a difference between a second data value of any one of at least one parameter included in service response information of a slice and a first data value of the any parameter required in service requirement information of the slice is less than or equal to a preset threshold, the slice management control network element determines that a slice service level agreement SLA has been signed for the slice. If the slice management control network element determines that a difference between a second data value of any one of at least one parameter included in service response information of a slice and a first data value of the any parameter required in service requirement information of the slice is greater than a preset threshold, the slice management control network element determines that no slice service level agreement SLA has been signed for the slice.

For example, if the slice management control network element determines that a difference between a second data value of any one of at least one parameter included in service response information of the first slice and a first data value of the any parameter required in service requirement information of the first slice is less than or equal to a preset threshold, the slice management control network element determines that a slice service level agreement SLA has been signed for the first slice.

If the slice management control network element determines that a difference between a second data value of any one of at least one parameter included in service response information of the second slice and a first data value of the any parameter required in service requirement information of the second slice is less than or equal to a first threshold, the slice management control network element determines that no slice service level agreement SLA has been signed for the second slice.

For example, a first bandwidth data value of the first slice that is requested by the slice management control network element is 10 M, and a second bandwidth data value of the first slice that is fed back by the data analytics function network element is 10.3 M. For example, the first threshold is 1 M. In this case, the slice management control network element determines that a slice service level agreement SLA has been signed for the first slice.

In addition, the slice management control network element obtains third indication information sent by the data analytics function network element, and the third indication information indicates a first difference between a second data value of any one of at least one parameter of a slice and a first data value of the any parameter required by the slice. In this case, the slice management control network element may determine, based on the difference and a preset threshold, whether a slice SLA has been signed for the slice. Specifically, if the slice management control network element determines that the first difference sent by the data analytics function network element is less than or equal to the first threshold, the slice management control network element determines that a slice SLA has been signed for the slice. If the slice management control network element determines that the first difference sent by the data analytics function network element is greater than the first threshold, the slice management control network element determines that no slice SLA has been signed for the slice.

For example, the data analytics function network element sends, to the slice management control network element, a first difference between a second data value of any one of at least one parameter of the first slice and a first data value of the any parameter required in service requirement information of the first slice. If the slice management control network element determines that the first difference is less than or equal to a first threshold, the slice management control network element determines that a slice service level agreement SLA has been signed for the first slice. The data analytics function network element sends, to the slice management control network element, a first difference between a second data value of any one of at least one parameter of the second slice and a first data value of the any parameter required in service requirement information of the second slice. If the slice management control network element determines that the first difference is greater than a first threshold, the slice management control network element determines that no slice service level agreement SLA has been signed for the second slice.

The first threshold is not limited in this embodiment of this application.

For example, the user control information includes one or more of the following information: a cell identifier and at least one piece of network slice instance information. The network slice instance information includes one or more of the following information about the network slice instance: identification information and a maximum user quantity.

In this embodiment of this application, a maximum user quantity of a slice is a maximum terminal quantity of the slice.

For example, the service control information includes one or more of the following information: a cell identifier and at least one piece of network slice instance information. The network slice instance information includes one or more of the following information: identification information and at least one piece of service configuration information. The service configuration information includes one or more of the following information about the service: a service identifier, a maximum service quantity, and at least one piece of service experience interval information. The service experience interval information includes one or more of the following information about the service experience interval: a size of the service experience interval, a maximum service quantity, and at least one set of QoS parameters.

For example, Table 7 shows content of the user control information.

TABLE 7

User control information

| Information element | Meaning |
|---|---|
| Time window | Time window in a network area |
| Network area (Cell ID or Cell ID) | Network area identifier |
| Cell-level UE registration control information | |
| >Cell ID | Identifier used to identify a cell |
| >>S-NSSAI | Slice identifier |
| >>>NSI ID | Identifier used to identify a slice instance |
| >>>Registration quantity in a slice instance | Maximum user quantity in a slice instance |

For example, Table 6 shows content of the service control information.

TABLE 8

Service control information

| Information element | Meaning |
|---|---|
| Time window | Time window in a network area |
| Network area (Cell ID or Cell ID) | Network area identifier |
| Cell-level UE registration control information | |
| >Cell ID | Identifier used to identify a cell |
| >>S-NSSAI | Slice identifier |
| >>>NSI ID | Identifier used to identify a slice instance |

TABLE 8-continued

Service control information

| Information element | Meaning |
|---|---|
| >>>>Application ID | Identifier used to identify a service |
| >>>>Number of users for application | Maximum service quantity for a service in a slice instance of a slice in a cell, that is, a quantity of services that can be accommodated in the cell |
| >>>>Number of users whose service MOS∈[0, 3.0] | Quantity of services in a range of service MOS∈[0, 3.0] that can be accommodated in a cell |
| >>>>Number of users whose service MOS∈[3.0, 4.0] | Quantity of services in a range of MOS∈[3.0, 4.0] that can be accommodated in a cell |
| >>>>Number of users whose service MOS∈[4.0, 5.0] | Quantity of services in a range of MOS∈[4.0, 5.0] that can be accommodated in a cell |
| >>>>Percentage of service MOS ≥ 3.0 | Percentage of services whose MOS is greater than or equal to 3.0 in services that can be accommodated in a cell |

For example, the service experience interval may be MOS∈[0, 3] or [3.0, 4.0] in Table 7, and the maximum service quantity of the service experience interval may be a quantity of services in a range of MOS∈[4.0, 5.0] that can be accommodated in a cell in Table 8.

Figure 6:
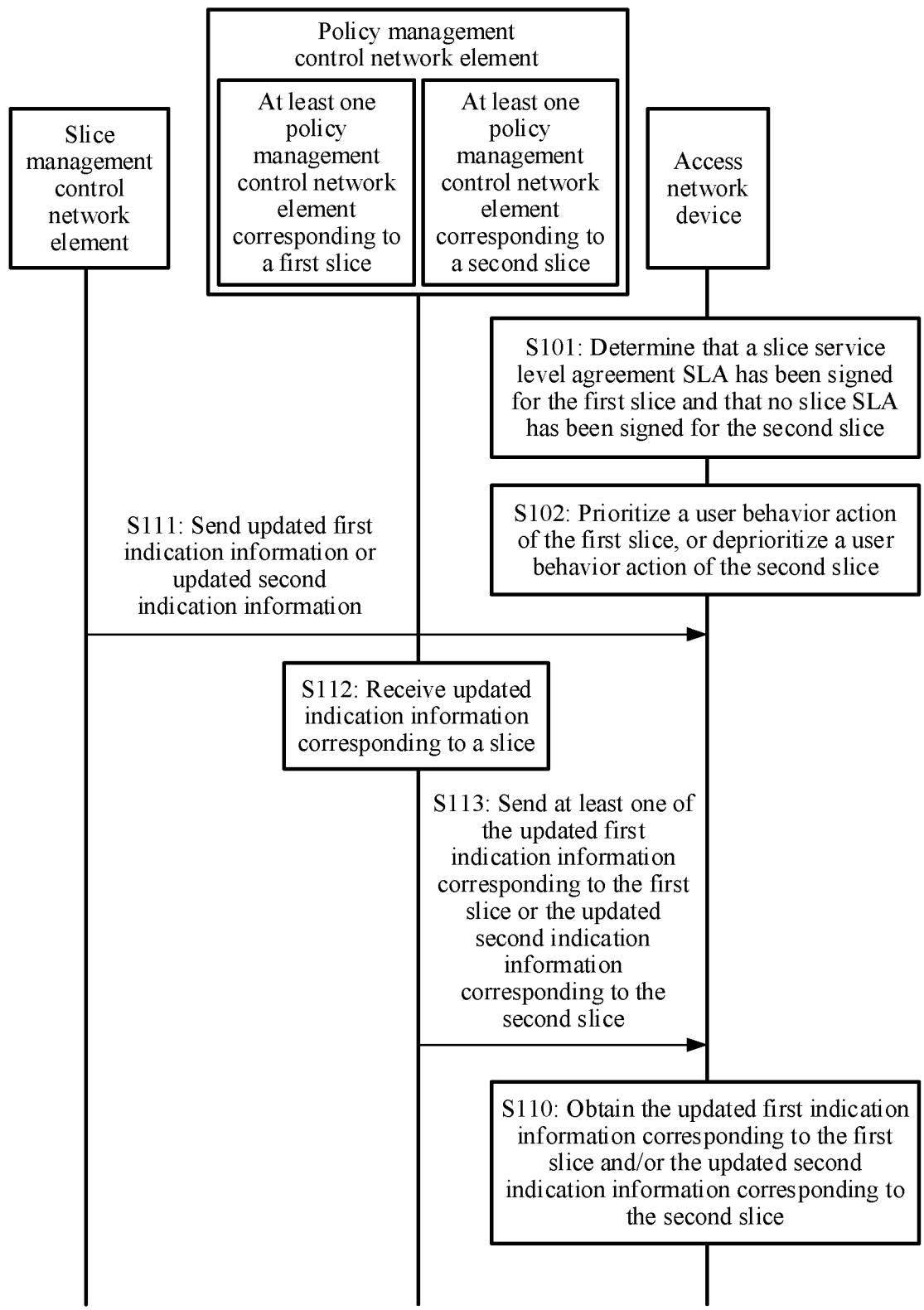

As shown in FIG. 6, the method provided in this embodiment of this application includes the following step:

S110: The access network device obtains updated first indication information corresponding to the first slice and/or updated second indication information corresponding to the second slice.

The updated first indication information corresponding to the first slice indicates to deactivate, modify, or delete the first indication information corresponding to the first slice.

The updated second indication information corresponding to the second slice indicates to deactivate, modify, or delete the second indication information corresponding to the second slice.

It should be understood that, if the policy management control network element sends the first indication information corresponding to the first slice and the second indication information corresponding to the second slice to the access network device, the access network device obtains the updated first indication information corresponding to the first slice, and obtains the updated second indication information corresponding to the second slice.

If the policy management control network element does not send the first indication information corresponding to the first slice to the access network device, but sends the second indication information corresponding to the second slice to the access network device, the access network device obtains the updated second indication information corresponding to the second slice.

If the policy management control network element sends the first indication information corresponding to the first slice to the access network device, but does not send the second indication information corresponding to the second slice, the access network device obtains the updated first indication information corresponding to the first slice.

In another embodiment of this application, still with reference to FIG. 6, before S110, the method provided in this embodiment of this application further includes the following steps.

S111: The slice management control network element sends the updated first indication information corresponding to the first slice to the at least one policy management control network element corresponding to the first slice; and/or the slice management control network element sends the updated second indication information corresponding to the second slice to the at least one policy management control network element corresponding to the second slice.

It should be understood that, for a rule for implementing S111 by the slice management control network element, refer to the rule 1 to the rule 3.

S112: The policy management control network element receives updated indication information corresponding to a slice.

Specifically, if the policy management control network element serves the first slice, the policy management control network element receives the updated first indication information that corresponds to the first slice and that is sent by the slice management control network element.

If the policy management control network element serves the second slice, the policy management control network element receives the updated second indication information that corresponds to the second slice and that is sent by the slice management control network element.

S113: The policy management control network element sends at least one of the updated first indication information corresponding to the first slice or the updated second indication information corresponding to the second slice to the access network device.

Specifically, if the policy management control network element serves the first slice, the policy management control network element sends the updated first indication information corresponding to the first slice to the access network device.

If the policy management control network element serves the second slice, the policy management control network element sends the updated second indication information corresponding to the second slice to the access network device.

If the policy management control network element serves the first slice and the second slice, the policy management control network element sends the updated first indication information corresponding to the first slice and the updated second indication information corresponding to the second slice to the access network device.

It should be understood that, an example in which the first slice and the second slice correspond to a same access network device is used in S113. If the first slice and the second slice correspond to different access network devices, the policy management control network element sends the updated first indication information corresponding to the first slice to an access network device corresponding to the first slice, and the policy management control network element sends the updated second indication information corresponding to the second slice to an access network device corresponding to the second slice.

It should be noted that, for a rule for implementing S113 by the policy management control network element, refer to the rule 1 to the rule 3.

In a possible implementation, S113 provided in this embodiment of this application may be specifically implemented in the following manner: The policy management control network element sends the updated second indication information corresponding to the first slice to the access network device in a running process of the QoS flow corresponding to the service of the first slice; and/or the policy management control network element sends the updated second indication information corresponding to the second slice to the access network device in a running process of the QoS flow corresponding to the service of the second slice.

For example, if the policy management control network element sends the updated second indication information corresponding to the second slice, the policy management control network element may send a QoS flow update request message to the access network device, and the QoS flow update request message includes the updated second indication information corresponding to the second slice.

In another possible embodiment of this application, the method provided in this embodiment of this application further includes: The slice management control network element determines that a slice SLA has been signed for the second slice.

In a manner, when the slice management control network element does not have the first information corresponding to the second slice, the slice management control network element may obtain, in the manner of S108 and S109, the first information corresponding to the second slice, and then may determine that a slice SLA has been signed for the second slice.

In another manner, the slice management control network element may further determine, based on the operator policy and/or the configuration of the second slice, that a slice SLA has been signed for the second slice.

In still another manner, the slice management control network element may further determine, based on a difference between a second data value of the at least one parameter of the second slice and a first data value of the at least one parameter of the second slice, that a slice SLA has been signed for the second slice. For specific details, refer to the descriptions in the foregoing embodiment. Details are not described herein again.

In another embodiment of this application, the access network device in this embodiment of this application may further obtain a priority of each slice, and then prioritizes a user behavior action of a slice with a higher priority, or deprioritizes a user behavior action of a slice with a lower priority, based on the priority of each slice. For example, the access network device determines a priority of the first slice in the at least two slices and a priority of the second slice in the at least two slices. The priority of the first slice is higher than the priority of the second slice.

It should be understood that, for a process in which the access network device obtains a priority of a slice, refer to the process in which the access network device obtains the indication information corresponding to the slice for which a slice service level agreement SLA has been signed in the foregoing embodiment. Details are not described herein.

In addition, it should be understood that a priority of each of the at least two slices may be preconfigured in the access network device.

For example, the first slice is a deployed slice, and the second slice is a newly established slice.

The foregoing mainly describes the solutions in the embodiments of this application from a perspective of interaction between the network elements. It can be understood that, to implement the foregoing functions, the slice information processing apparatus includes a corresponding hardware structure and/or software module for performing each of the functions. A person skilled in the art should be easily aware that units, algorithms, and steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the slice information processing apparatus may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that, in the embodiments of this application, division into the units is an example and is merely logical function division, and there may be other division manners during actual implementation.

The following provides a description by using an example in which each function module is obtained through division based on each corresponding function.

Figure 7:
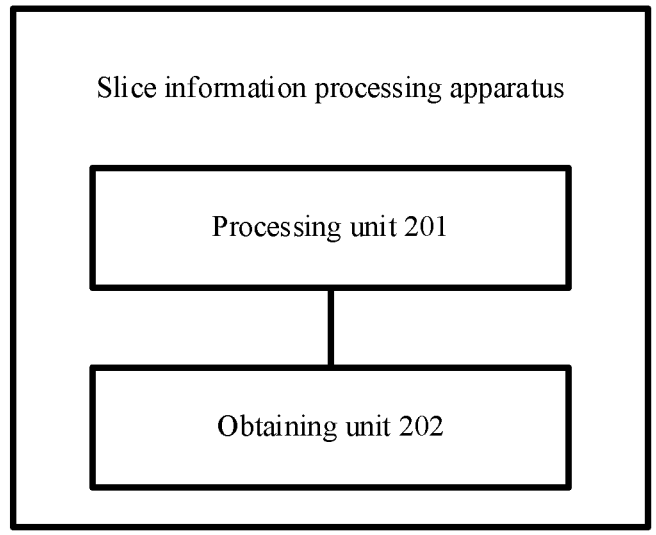
FIG. 7 to FIG. 15 are schematic structural diagrams of slice information processing apparatuses according to embodiments of this application.

When an integrated unit is used, FIG. 7 is a possible schematic structural diagram of a slice information processing apparatus in the foregoing embodiment. The slice information processing apparatus may be an access network device or a chip applied to the access network device. The slice information processing apparatus includes a processing unit 201. Optionally, the slice information processing apparatus may further include an obtaining unit 202.

The processing unit 201 is configured to support the slice information processing apparatus in performing S101 and S102 in the foregoing embodiment. The obtaining unit 202 is configured to support the slice information processing apparatus in performing S107 and S110 in the foregoing embodiment.

Figure 8:
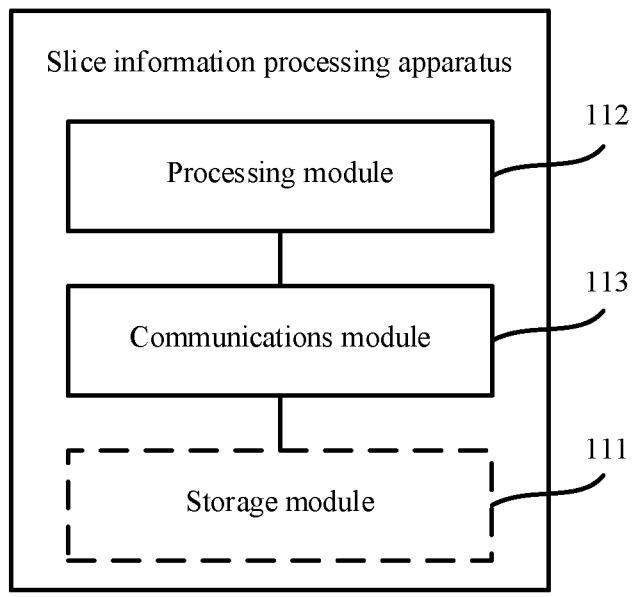

When an integrated unit is used, FIG. 8 is a possible schematic diagram of a logical structure of a slice information processing apparatus in the foregoing embodiment. The slice information processing apparatus may be an access network device or a chip applied to the access network device. The slice information processing apparatus includes a processing module 112 and a communications module 113. The processing module 112 is configured to control and manage an action of the slice information processing apparatus. For example, the processing module 112 is configured to support the slice information processing apparatus in performing the step of information/data processing. The communications module 113 is configured to support the slice information processing apparatus in performing the step of information/data sending or receiving. Optionally, the slice information processing apparatus may further include a storage module 111, configured to store program code and data for the slice information processing apparatus.

For example, the processing module 112 is configured to support the slice information processing apparatus in performing S101 and S102 in the foregoing embodiment. The communications module 113 is configured to support the slice information processing apparatus in performing S107 and S110 in the foregoing embodiment.

The processing module 112 may be a processor or a controller, for example, may be a central processing unit, a general-purpose processor, a digital signal processor, an application-specific integrated circuit, a field-programmable gate array or another programmable logic device, a transistor logic device, a hardware component, or any combination thereof. The processing module 112 may implement or execute various example logical blocks, modules, and circuits described with reference to content disclosed in the present application. Alternatively, the processor may be a combination of processors implementing a computing function, for example, a combination of one or more microprocessors, or a combination of a digital signal processor and a microprocessor. The communications module 113 may be a transceiver, a transceiver circuit, a communications interface, or the like. The storage module 111 may be a memory.

Figure 9:
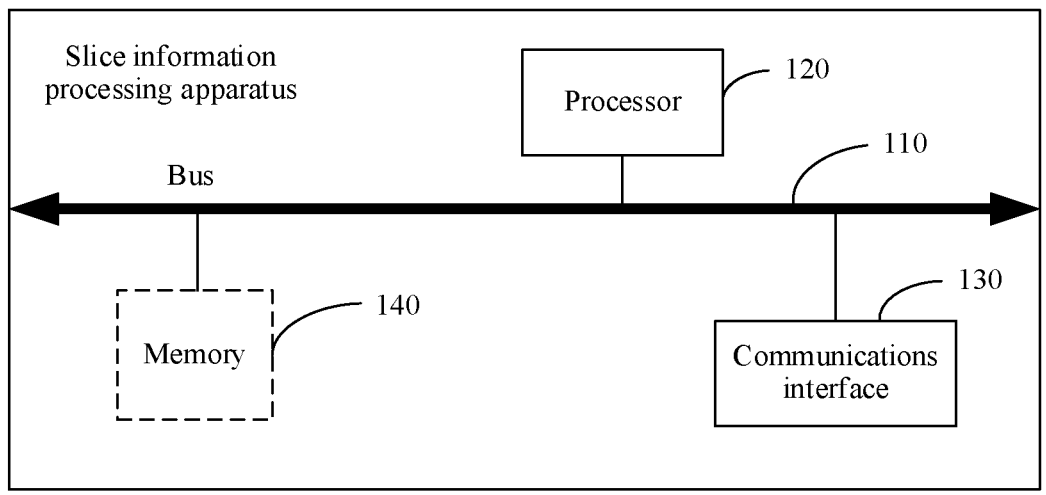

When the processing module 112 is a processor 120, the communication module 113 is a communications interface 130 or a transceiver, and the storage module 111 is a memory 140, the slice information processing apparatus in this application may be a device shown in FIG. 9.

The communications interface 130, the at least one processor 120, and the memory 140 are connected to each other by using a bus 110. The bus 110 may be a PCI bus, an EISA bus, or the like. The bus may be classified into an address bus, a data bus, a control bus, and the like. For ease of representation, only one thick line is used to represent the bus in FIG. 9, but this does not mean that there is only one bus or only one type of bus. The memory 140 is configured to store program code and data for the slice information processing apparatus. The communications interface 130 is configured to support the slice information processing apparatus in communicating with another device (for example, a policy management control network element). The processor 120 is configured to support the slice information processing apparatus in executing the program code and the data that are stored in the memory 140, to implement the slice information processing method provided in this application.

Figure 10:
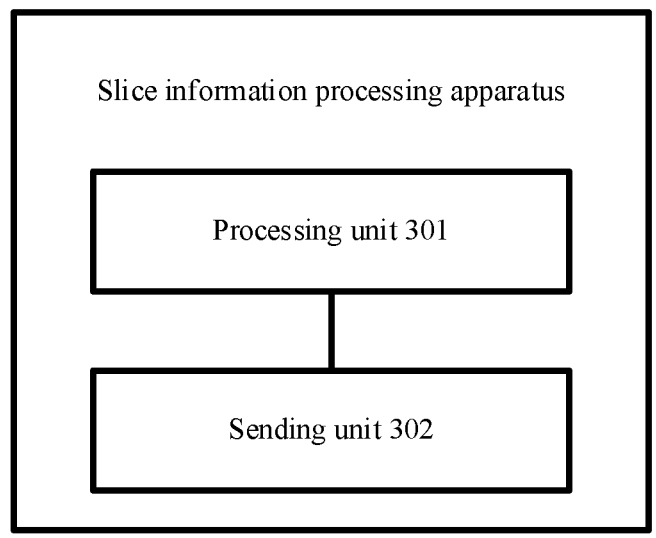

When an integrated unit is used, FIG. 10 is a possible schematic structural diagram of a slice information processing apparatus in the foregoing embodiment. The slice information processing apparatus may be a slice management control network element or a chip applied to the slice management control network element. The slice information processing apparatus includes a processing unit 301 and a sending unit 302.

The processing unit 301 is configured to support the slice information processing apparatus in performing S103 in the foregoing embodiment. The sending unit 302 is configured to support the slice information processing apparatus in performing S104, S108, and S1i1 in the foregoing embodiment.

Figure 11:
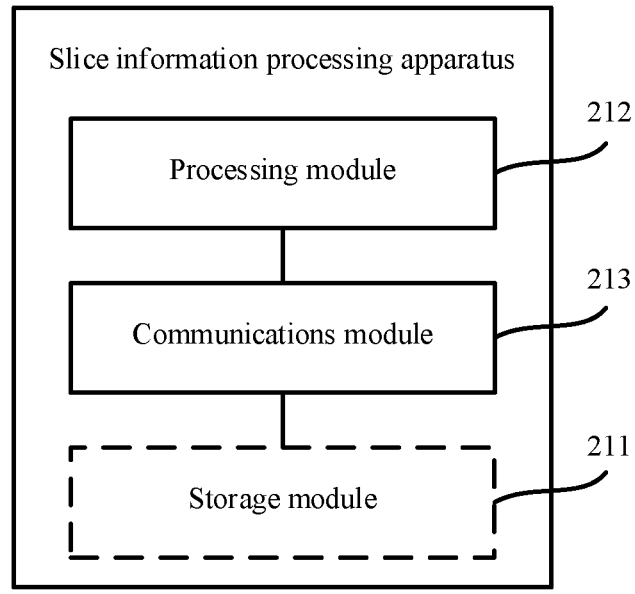

When an integrated unit is used, FIG. 11 is a possible schematic diagram of a logical structure of a slice information processing apparatus in the foregoing embodiment. The slice information processing apparatus may be a slice management control network element or a chip applied to the slice management control network element. The slice information processing apparatus includes a processing module 212 and a communications module 213. The processing module 212 is configured to control and manage an action of the slice information processing apparatus. For example, the processing module 212 is configured to support the slice information processing apparatus in performing the step of information/data processing. The communications module 213 is configured to support the slice information processing apparatus in performing the step of information/data sending or receiving. Optionally, the slice information processing apparatus may further include a storage module 211, configured to store program code and data for the slice information processing apparatus.

For example, the processing module 212 is configured to support the slice information processing apparatus in performing S103 in the foregoing embodiment. The communications module 213 is configured to support the slice information processing apparatus in performing S104, S108, and S111 in the foregoing embodiment.

The processing module 212 may be a processor or controller, for example, may be a central processing unit, a general-purpose processor, a digital signal processor, an application-specific integrated circuit, a field-programmable gate array or another programmable logic device, a transistor logic device, a hardware component, or any combination thereof. The processing module 212 may implement or execute various example logical blocks, modules, and circuits described with reference to content disclosed in the present application. Alternatively, the processor may be a combination of processors implementing a computing function, for example, a combination of one or more microprocessors, or a combination of a digital signal processor and a microprocessor. The communications module 213 may be a transceiver, a transceiver circuit, a communications interface, or the like. The storage module 211 may be a memory.

Figure 12:
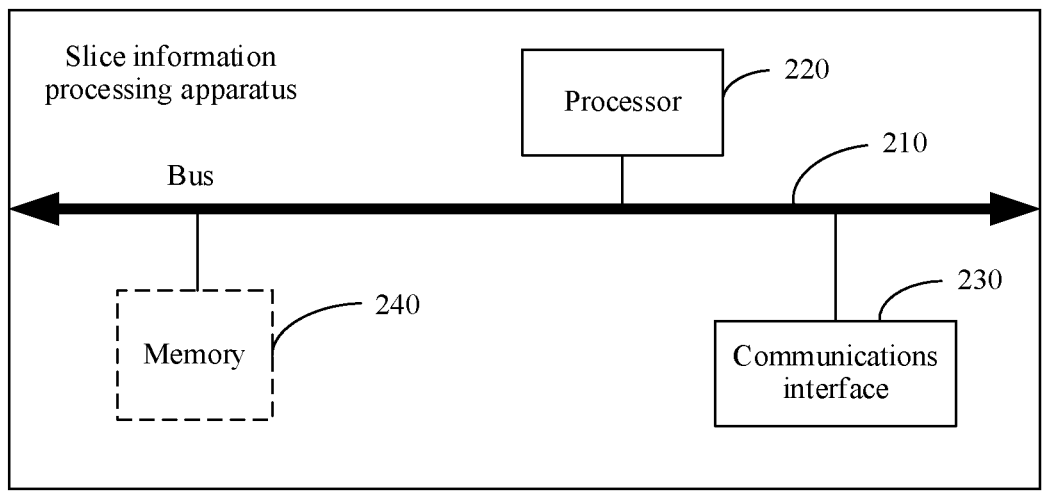

When the processing module 212 is a processor 220, the communication module 213 is a communications interface 230 or a transceiver, and the storage module 211 is a memory 240, the slice information processing apparatus in this application may be a device shown in FIG. 12.

The communications interface 230, the at least one processor 220, and the memory 240 are connected to each other by using a bus 210. The bus 210 may be a PCI bus, an EISA bus, or the like. The bus may be classified into an address bus, a data bus, a control bus, and the like. For ease of indication, only one thick line is used to represent in FIG. 12, but it does not mean that there is only one bus or only one type of bus. The memory 240 is configured to store program code and data for the slice information processing apparatus. The communications interface 230 is configured to support the slice information processing apparatus in communicating with another device (for example, a policy management control network element). The processor 220 is configured to support the slice information processing apparatus in executing the program code and the data that are stored in the memory 240, to implement the slice information processing method provided in this application.

Figure 13:
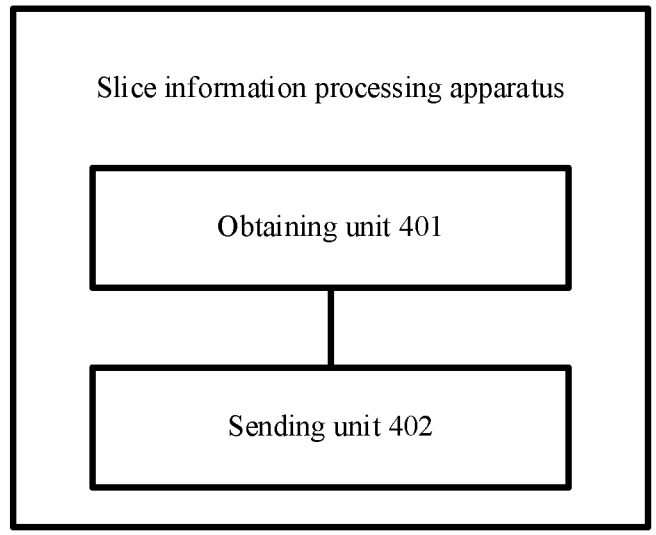

When an integrated unit is used, FIG. 13 is a possible schematic structural diagram of a slice information processing apparatus in the foregoing embodiment. The slice information processing apparatus may be a policy management control network element or a chip applied to the policy management control network element. The slice information processing apparatus includes an obtaining unit 401 and a sending unit 402.

The obtaining unit 401 is configured to support the slice information processing apparatus in performing S105 in the foregoing embodiment. The sending unit 402 is configured to support the slice information processing apparatus in performing S106 in the foregoing embodiment.

Figure 14:
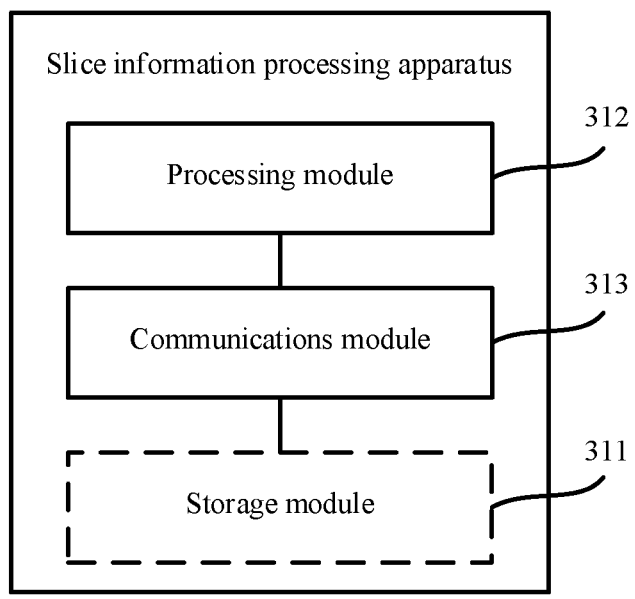

When an integrated unit is used, FIG. 14 is a possible schematic diagram of a logical structure of a slice information processing apparatus in the foregoing embodiment. The slice information processing apparatus may be a policy management control network element or a chip applied to the policy management control network element. The slice information processing apparatus includes a processing module 312 and a communications module 313. The processing module 312 is configured to control and manage an action of the slice information processing apparatus. For example, the processing module 312 is configured to support the slice information processing apparatus in performing the step of information/data processing. The communications module 313 is configured to support the slice information processing apparatus in performing the step of information/data sending or receiving. Optionally, the slice information processing apparatus may further include a storage module 311, configured to store program code and data for the slice information processing apparatus.

For example, the communications module 313 is configured to support the slice information processing apparatus in performing S105 and S106 in the foregoing embodiment.

The processing module 312 may be a processor or controller, for example, may be a central processing unit, a general-purpose processor, a digital signal processor, an application-specific integrated circuit, a field-programmable gate array or another programmable logic device, a transistor logic device, a hardware component, or any combination thereof. The processing module 312 may implement or execute various example logical blocks, modules, and circuits described with reference to content disclosed in the present application. Alternatively, the processor may be a combination of processors implementing a computing function, for example, a combination of one or more microprocessors, or a combination of a digital signal processor and a microprocessor. The communications module 313 may be a transceiver, a transceiver circuit, a communications interface, or the like. The storage module 311 may be a memory.

Figure 15:
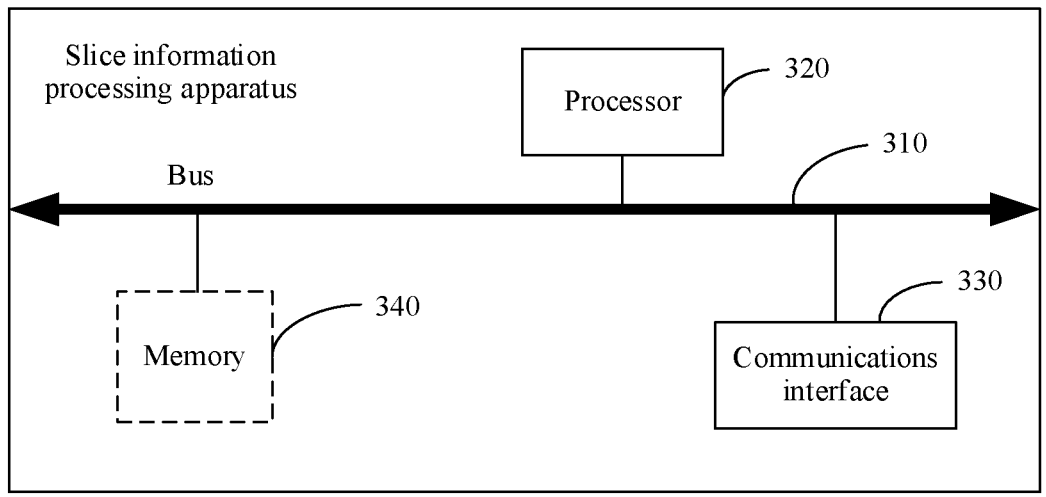

When the processing module 312 is a processor 320, the communications module 313 is a communications interface 330 or a transceiver, and the storage module 311 is a memory 340, the slice information processing apparatus in this application may be a device shown in FIG. 15.

The communications interface 330, the at least one processor 320, and the memory 340 are connected to each other by using a bus 310. The bus 310 may be a PCI bus, an EISA bus, or the like. The bus may be classified into an address bus, a data bus, a control bus, and the like. For ease of representation, only one thick line is used to represent the bus in FIG. 15, but this does not mean that there is only one bus or only one type of bus. The memory 340 is configured to store program code and data for the slice information processing apparatus. The communications interface 330 is configured to support the slice information processing apparatus in communicating with another device (for example, a policy management control network element). The processor 320 is configured to support the slice information processing apparatus in executing the program code and the data that are stored in the memory 340, to implement the slice information processing method provided in this application.

Figure 16:
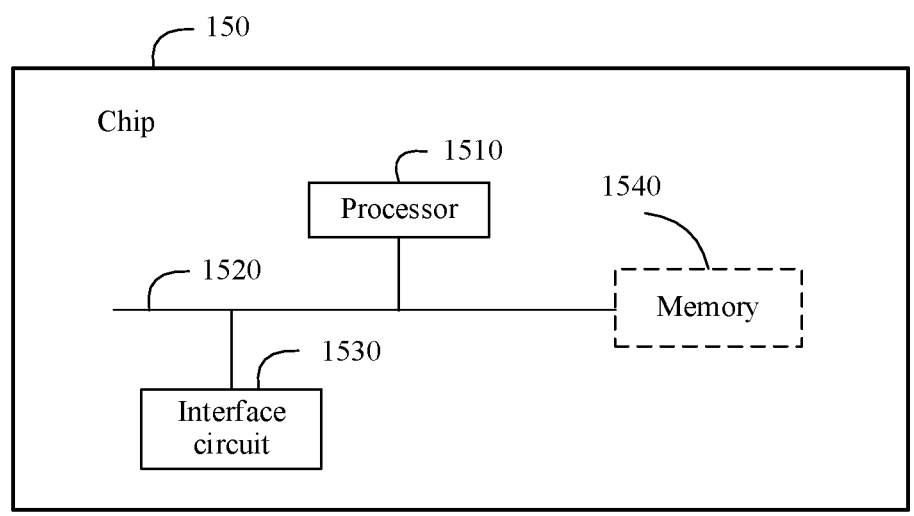
FIG. 16 is a schematic structural diagram of a chip according to an embodiment of this application.

FIG. 16 is a schematic structural diagram of a chip 150 according to an embodiment of the present application. The chip 150 includes one or more (including two) processors 1510 and an interface circuit 1530.

Optionally, the chip 150 further includes a memory 1540. The memory 1540 may include a read-only memory and a random access memory, and provide an operation instruction and data for the processor 1510. A part of the memory 1540 may further include a non-volatile random access memory (NVRAM).

In some implementations, the memory 1540 stores the following elements: an executable module or a data structure, or a subset thereof, or an extension set thereof.

In this embodiment of the present application, a corresponding operation is performed by invoking the operation instruction stored in the memory 1540 (the operation instruction may be stored in an operating system).

In a possible implementation, structures of chips used by a policy control function network element, an access network device, and a slice management control network element are similar, and different apparatuses may use different chips to implement respective functions.

The processor 1510 controls a communications apparatus and operations of the communications apparatus. The processor 1510 may also be referred to as a central processing unit (CPU). The memory 1540 may include a read-only memory and a random access memory, and provide an instruction and data for the processor 1510. A part of the memory 1540 may further include a non-volatile random access memory (NVRAM). For example, during application, the memory 1510, the interface circuit 1530, and the memory 1540 are coupled together by using a bus system 1520. The bus system 1520 may further include a power bus, a control bus, a status signal bus, and the like in addition to a data bus. However, for clarity of description, various buses are marked as the bus system 1520 in FIG. 16.

The method disclosed in the foregoing embodiment of the present application may be applied to the processor 1510, or may be implemented by the processor 1510. The processor 1510 may be an integrated circuit chip and has a signal processing capability. In an implementation process, the steps in the foregoing method may be performed by using a hardware integrated logical circuit in the processor 1510, or by using an instruction in a form of software. The processor 1510 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, steps, and logical block diagrams that are disclosed in the embodiments of the present application. The general-purpose processor may be a microprocessor, or may be any conventional processor or the like. The steps of the method disclosed with reference to the embodiments of the present application may be directly performed by a hardware decoding processor, or may be performed by a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 to perform the steps in the foregoing method in combination with hardware of the processor 1510.

In a possible implementation, the interface circuit 1530 is configured to perform receiving and sending steps performed by the policy control function network element, the access network device, and the slice management control network element in the embodiments shown in FIG. 3, FIG. 4, FIG. 5A and FIG. 5B, and FIG. 6. The processor 1510 is configured to perform processing steps performed by the policy control function network element, the access network device, and the slice management control network element in the embodiments shown in FIG. 3, FIG. 4, FIG. 5A and FIG. 5B, and FIG. 6.

In the foregoing embodiment, the instruction that is stored in the memory and that is to be executed by the processor may be implemented in a form of a computer program product. The computer program product may be written into the memory in advance, or may be downloaded in a form of software and installed in the memory.

The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive, (SSD)), or the like.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, the term "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the scope of this application.

Correspondingly, the specification and the accompanying drawings are merely example descriptions of this application defined by the appended claims, and are intended to cover any of or all modifications, variations, combinations, or equivalents within the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A method, comprising:
   determining, by an access network device, that a slice service level agreement (SLA) has been signed for a first slice and that no slice SLA has been signed for a second slice; and
   prioritizing, by the access network device, a user behavior action of the first slice, or deprioritizing a user behavior action of the second slice.

2. The method according to claim 1, wherein the user behavior action comprises user access control or user quality of service (QoS) flow management control.

3. The method according to claim 2, wherein the user access control comprises at least one of user radio resource control (RRC) establishment, or user RRC release; and
   the user QoS flow management control comprises at least one of QoS flow establishment of a user service, or QoS flow quality assurance of a user service.

4. The method according to claim 1, wherein the determining that the slice SLA has been signed for the first slice and that no slice SLA has been signed for the second slice comprises at least one of:
   determining, by the access network device based on first indication information, that an SLA has been signed for the first slice, wherein the first indication information indicates that an SLA has been signed for the first slice; or
   determining, by the access network device based on second indication information, that no slice SLA has been signed for the second slice, wherein the second indication information indicates that no slice SLA has been signed for the second slice.

5. The method according to claim 1, wherein the method further comprises at least one of:
   obtaining, by the access network device, the first indication information from at least one policy management control network element corresponding to the first slice; or
   obtaining, by the access network device, the second indication information from at least one policy management control network element corresponding to the second slice.

6. The method according to claim 1, wherein the method further comprises at least one of:
   obtaining, by the access network device in a process of establishing a QoS flow corresponding to a service of the first slice, the first indication information from at least one policy management control network element corresponding to the first slice; or
   obtaining, by the access network device in a process of establishing a QoS flow corresponding to a service of the second slice, the second indication information from at least one policy management control network element corresponding to the second slice.

7. The method according to claim 5, wherein the first indication information further indicates that the first slice is a slice that has been tested or deployed, and the second indication information further indicates that the second slice is a slice that has not been tested or deployed.

8. The method according to claim 1, wherein the method further comprises:
   obtaining, by the access network device, at least one of updated first indication information corresponding to the first slice or updated second indication information corresponding to the second slice.

9. The method according to claim 8, wherein the updated first indication information corresponding to the first slice indicates to deactivate, modify, or delete the first indication information corresponding to the first slice; and the updated second indication information corresponding to the second slice indicates to deactivate, modify, or delete the second indication information corresponding to the second slice.

10. An apparatus, comprising:
    a memory, configured to store computer instructions; and
    a processor, configured to execute the computer instructions in the memory, to cause the apparatus to:
      determine that a slice service level agreement (SLA) has been signed for a first slice and that no slice SLA has been signed for a second slice; and
      prioritize a user behavior action of the first slice, or deprioritize a user behavior action of the second slice.

11. The apparatus according to claim 10, wherein the user behavior action comprises user access control or user quality of service (QoS) flow management control.

12. The apparatus according to claim 11, wherein the user access control comprises at least one of user radio resource control (RRC) establishment, or user RRC release; and the user QoS flow management control comprises at least one of QoS flow establishment of a user service, or QoS flow quality assurance of a user service.

13. The apparatus according to claim 10, wherein the processor is configured to execute the computer instructions in the memory to cause the apparatus to perform at least one of:
    determine, based on first indication information, that an SLA has been signed for the first slice, wherein the first indication information indicates that an SLA has been signed for the first slice; or
    determine, based on second indication information, that no slice SLA has been signed for the second slice, wherein the second indication information indicates that no slice SLA has been signed for the second slice.

14. The apparatus according to claim 10, wherein the processor is configured to execute the computer instructions in the memory to cause the apparatus to further perform at least one of:
    obtain the first indication information from at least one policy management control network element corresponding to the first slice; or
    obtain the second indication information from at least one policy management control network element corresponding to the second slice.

15. The apparatus according to claim 10, wherein the processor is configured to execute the computer instructions in the memory to cause the apparatus to further perform at least one of:
    obtain, in a process of establishing a QoS flow corresponding to a service of the first slice, the first indication information from at least one policy management control network element corresponding to the first slice; or obtain, in a process of establishing a QoS flow corresponding to a service of the second slice, the second indication information from at least one policy management control network element corresponding to the second slice.

16. The apparatus according to claim 14, wherein the first indication information further indicates that the first slice is a slice that has been tested or deployed, and the second indication information further indicates that the second slice is a slice that has not been tested or deployed.

17. The apparatus according to claim 10, wherein the processor is further configured to execute the computer instructions in the memory to cause the apparatus to:

obtain at least one of updated first indication information corresponding to the first slice or updated second indication information corresponding to the second slice.

18. The apparatus according to claim 17, wherein the updated first indication information corresponding to the first slice indicates to deactivate, modify, or delete the first indication information corresponding to the first slice; and the updated second indication information corresponding to the second slice indicates to deactivate, modify, or delete the second indication information corresponding to the second slice.

19. A method, comprising:

sending, by a policy management control network element corresponding to a first slice, first indication information to an access network device, wherein the first indication information indicates that a slice service level agreement (SLA) has been signed for the first slice;

sending, by a policy management control network element corresponding to a second slice, second indication information to the access network device, wherein the second indication information indicates that no SLA has been signed for the second slice;

determining, by the access network device, that a slice service level agreement (SLA) has been signed for the first slice based on the first indication information;

determining, by the access network device, that no slice SLA has been signed for the second slice; and prioritizing, by the access network device, a user behavior action of the first slice, or deprioritizing a user behavior action of the second slice.

20. The method according to claim 19, wherein the user behavior action comprises user access control or user quality of service (QoS) flow management control.

* * * * *